(12) United States Patent
Akl et al.

(10) Patent No.: US 12,477,416 B2
(45) Date of Patent: Nov. 18, 2025

(54) SELECTION OF AN ENERGY-SAVING CELL FOR CONDITIONAL HANDOVER

(71) Applicant: QUALCOMM Incorporated, San Diego, CA (US)

(72) Inventors: Naeem Akl, Somerville, NJ (US); Navid Abedini, Basking Ridge, NJ (US); Karl Georg Hampel, Jersey City, NJ (US); Junyi Li, Fairless Hills, PA (US); Tao Luo, San Diego, CA (US)

( * ) Notice: Subject to any disclaimer, the term of this patent is extended or adjusted under 35 U.S.C. 154(b) by 382 days.

(21) Appl. No.: 17/812,010

(22) Filed: Jul. 12, 2022

(65) Prior Publication Data

US 2024/0022978 A1  Jan. 18, 2024

(51) Int. Cl.
*H04W 36/00* (2009.01)

(52) U.S. Cl.
CPC . *H04W 36/00837* (2018.08); *H04W 36/0058* (2018.08); *H04W 36/0061* (2013.01)

(58) Field of Classification Search
None
See application file for complete search history.

(56) References Cited

U.S. PATENT DOCUMENTS

| | | | | |
|---|---|---|---|---|
| 11,979,779 B2 * | 5/2024 | Fujishiro | ........... | H04W 36/0061 |
| 2012/0039238 A1 * | 2/2012 | Li | ..................... | H04W 52/0206 370/315 |
| 2016/0157174 A1 * | 6/2016 | Chou | ..................... | H04L 47/76 370/331 |
| 2017/0223597 A1 * | 8/2017 | Telang | .................. | H04W 36/24 |
| 2020/0329428 A1 * | 10/2020 | Chou | .................... | H04W 36/22 |
| 2020/0351734 A1 * | 11/2020 | Purkayastha | ..... | H04W 74/0833 |
| 2021/0051545 A1 * | 2/2021 | Luo | ........................ | H04W 76/11 |
| 2021/0051549 A1 * | 2/2021 | Akl | ..................... | H04W 36/0058 |
| 2021/0084545 A1 * | 3/2021 | Akl | ...................... | H04B 7/0695 |
| 2021/0105690 A1 * | 4/2021 | Wu | ..................... | H04W 36/362 |
| 2021/0168678 A1 * | 6/2021 | Deenoo | .............. | H04W 36/305 |
| 2021/0400545 A1 * | 12/2021 | Akl | .................. | H04W 36/0058 |
| 2022/0030484 A1 * | 1/2022 | Cheng | ............. | H04W 36/00835 |
| 2022/0322175 A1 * | 10/2022 | Liu | ................... | H04W 28/0861 |
| 2022/0338077 A1 * | 10/2022 | Kim | ..................... | H04W 76/30 |
| 2022/0338090 A1 * | 10/2022 | Wang | .................. | H04W 36/362 |
| 2022/0377629 A1 * | 11/2022 | Rugeland | .......... | H04W 36/0094 |
| 2022/0394583 A1 * | 12/2022 | Deenoo | .............. | H04W 36/305 |
| 2024/0022978 A1 * | 1/2024 | Akl | ..................... | H04W 36/362 |
| 2024/0098588 A1 * | 3/2024 | Da Silva | ............... | H04W 24/10 |
| 2024/0187957 A1 * | 6/2024 | Petermann | ............ | H04W 72/54 |
| 2024/0381215 A1 * | 11/2024 | Elazzouni | ......... | H04W 52/0209 |

FOREIGN PATENT DOCUMENTS

| WO | WO-2020119597 A1 * | 6/2020 | ........ H04W 36/0058 |
|---|---|---|---|
| WO | WO-2022012734 A1 * | 1/2022 | ............ H04W 36/36 |

* cited by examiner

*Primary Examiner* — Christopher T Wyllie

(57) ABSTRACT

Various aspects of the present disclosure generally relate to wireless communication. In some aspects, a user equipment (UE) may receive, from a network entity, a configuration of one or more conditional handover conditions associated with a first candidate cell. The UE may receive an indication of an operating mode associated with the first candidate cell. The UE may perform a conditional handover procedure based at least in part on the configuration of the one or more conditional handover conditions and the indication of the operating mode associated with the first candidate cell. Numerous other aspects are described.

30 Claims, 10 Drawing Sheets

SELECTION OF AN ENERGY-SAVING CELL FOR CONDITIONAL HANDOVER

FIELD OF THE DISCLOSURE

Aspects of the present disclosure generally relate to wireless communication and to techniques and apparatuses for selection of an energy-saving cell for conditional handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a configuration of one or more conditional handover conditions associated with a first candidate cell. The method may include receiving an indication of an operating mode associated with the first candidate cell. The method may include performing a conditional handover procedure based at least in part on the configuration of the one or more conditional handover conditions and the indication of the operating mode associated with the first candidate cell.

Some aspects described herein relate to a method of wireless communication performed by a network entity. The method may include transmitting, to a UE, a configuration of one or more conditional handover conditions associated with a first candidate cell of a conditional handover procedure, wherein the configuration of the one or more conditional handover conditions is based at least in part on an operating mode associated with the first candidate cell. The method may include transmitting, to the UE, an indication of the operating mode associated with the first candidate cell.

Some aspects described herein relate to an apparatus for wireless communication at a UE. The apparatus may include a processor, memory coupled to the processor, and instructions stored in the memory and executable by the processor. The instructions, when executed by the processor, may cause the apparatus to receive, from a network entity, a configuration of one or more conditional handover conditions associated with a first candidate cell. The instructions, when executed by the processor, may cause the apparatus to receive an indication of an operating mode associated with the first candidate cell. The instructions, when executed by the processor, may cause the apparatus to perform a conditional handover procedure based at least in part on the configuration of the one or more conditional handover conditions and the indication of the operating mode associated with the first candidate cell.

Some aspects described herein relate to an apparatus for wireless communication at a network entity. The apparatus may include a processor, memory coupled to the processor, and instructions stored in the memory and executable by the processor. The instructions, when executed by the processor, may cause the apparatus to transmit, to a UE, a configuration of one or more conditional handover conditions associated with a first candidate cell of a conditional handover procedure, wherein the configuration of the one or more conditional handover conditions is based at least in part on an operating mode associated with the first candidate cell. The instructions, when executed by the processor, may cause the apparatus to transmit, to the UE, an indication of the operating mode associated with the first candidate cell.

Some aspects described herein relate to a non-transitory computer-readable medium that stores a set of instructions for wireless communication by a UE. The set of instructions, when executed by one or more processors of the UE, may cause the UE to receive, from a network entity, a configuration of one or more conditional handover conditions associated with a first candidate cell. The set of instructions, when executed by one or more processors of the UE, may cause the UE to receive an indication of an operating mode associated with the first candidate cell. The set of instructions, when executed by one or more processors of the UE, may cause the UE to perform a conditional handover procedure based at least in part on the configuration of the one or more conditional handover conditions and the indication of the operating mode associated with the first candidate cell.

Some aspects described herein relate to a non-transitory computer-readable medium that stores a set of instructions for wireless communication by a network entity. The set of instructions, when executed by one or more processors of the network entity, may cause the network entity to transmit, to a UE, a configuration of one or more conditional handover conditions associated with a first candidate cell of a conditional handover procedure, wherein the configuration of the one or more conditional handover conditions is based at least in part on an operating mode associated with the first candidate cell. The set of instructions, when executed by one or more processors of the network entity, may cause the network entity to transmit, to the UE, an indication of the operating mode associated with the first candidate cell.

Some aspects described herein relate to an apparatus for wireless communication. The apparatus may include means for receiving, from a network entity, a configuration of one or more conditional handover conditions associated with a first candidate cell. The apparatus may include means for receiving an indication of an operating mode associated with the first candidate cell. The apparatus may include means for performing a conditional handover procedure based at least in part on the configuration of the one or more conditional handover conditions and the indication of the operating mode associated with the first candidate cell.

Some aspects described herein relate to an apparatus for wireless communication. The apparatus may include means for transmitting, to a UE, a configuration of one or more conditional handover conditions associated with a first candidate cell of a conditional handover procedure, wherein the configuration of the one or more conditional handover conditions is based at least in part on an operating mode associated with the first candidate cell. The apparatus may include means for transmitting, to the UE, an indication of the operating mode associated with the first candidate cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
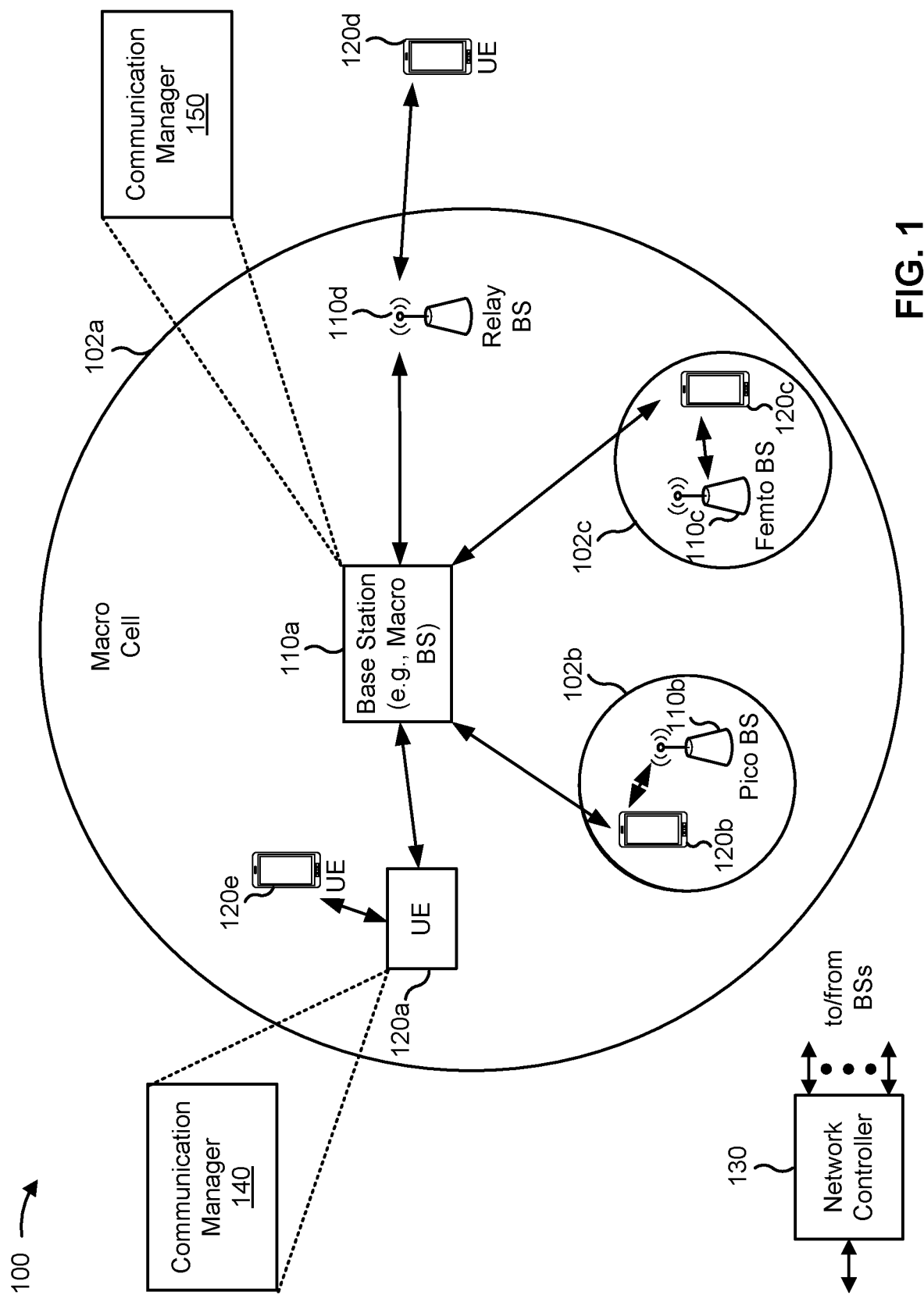
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a configuration of one or more conditional handover conditions associated with a first candidate cell; receive an indication of an operating mode associated with the first candidate cell; and perform a conditional handover procedure based at least in part on the configuration of the one or more conditional handover conditions and the indication of the operating mode associated with the first candidate cell. Additionally, or alternatively, the communication manager 140 may perform one or more other operations described herein.

In some aspects, the network entity described herein may be associated with the base station 110. In such aspects, the network entity may include a communication manager 150. As described in more detail elsewhere herein, the communication manager 150 may transmit, to a UE (e.g., UE 120), a configuration of one or more conditional handover conditions associated with a first candidate cell of a conditional handover procedure, wherein the configuration of the one or more conditional handover conditions is based at least in part on an operating mode associated with the first candidate cell; and transmit, to the UE, an indication of the operating mode associated with the first candidate cell. Additionally, or alternatively, the communication manager 150 may perform one or more other operations described herein.

As indicated above, FIG. 1 is provided as an example. Other examples may differ from what is described with regard to FIG. 1.

Figure 2:
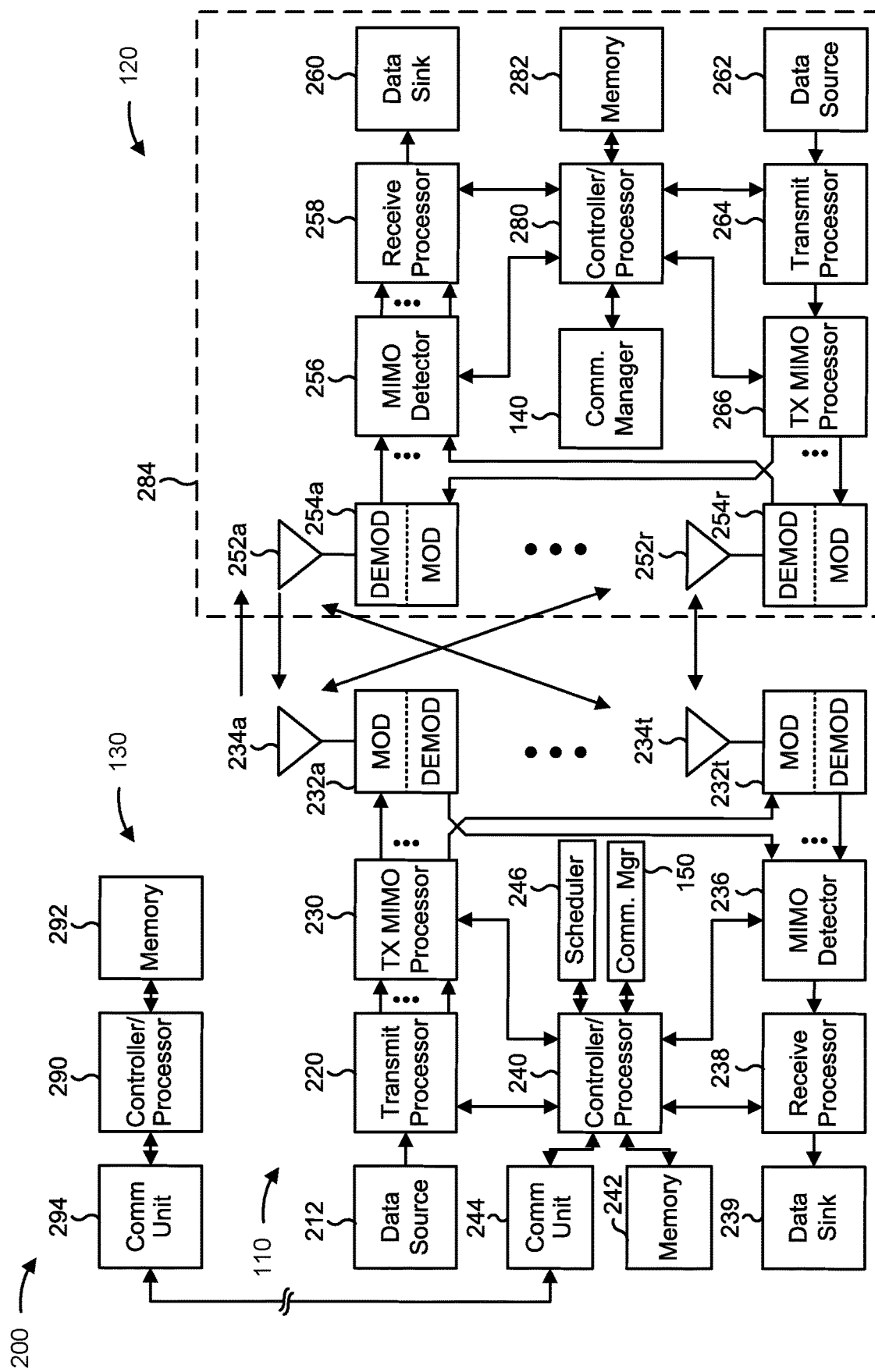
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with selection of an energy-saving cell for conditional handover, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a configuration of one or more conditional handover conditions associated with a first candidate cell; means for receiving an indication of an operating mode associated with the first candidate cell; and/or means for performing a conditional handover procedure based at least in part on the configuration of the one or more conditional handover conditions and the indication of the operating mode associated with the first candidate cell. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting, to a UE (e.g., the UE 120), a configuration of one or more conditional handover conditions associated with a first candidate cell of a conditional handover procedure, wherein the configuration of the one or more conditional handover conditions is based at least in part on an operating mode associated with the first candidate cell; and/or means for transmitting, to the UE, an indication of the operating mode associated with the first candidate cell. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
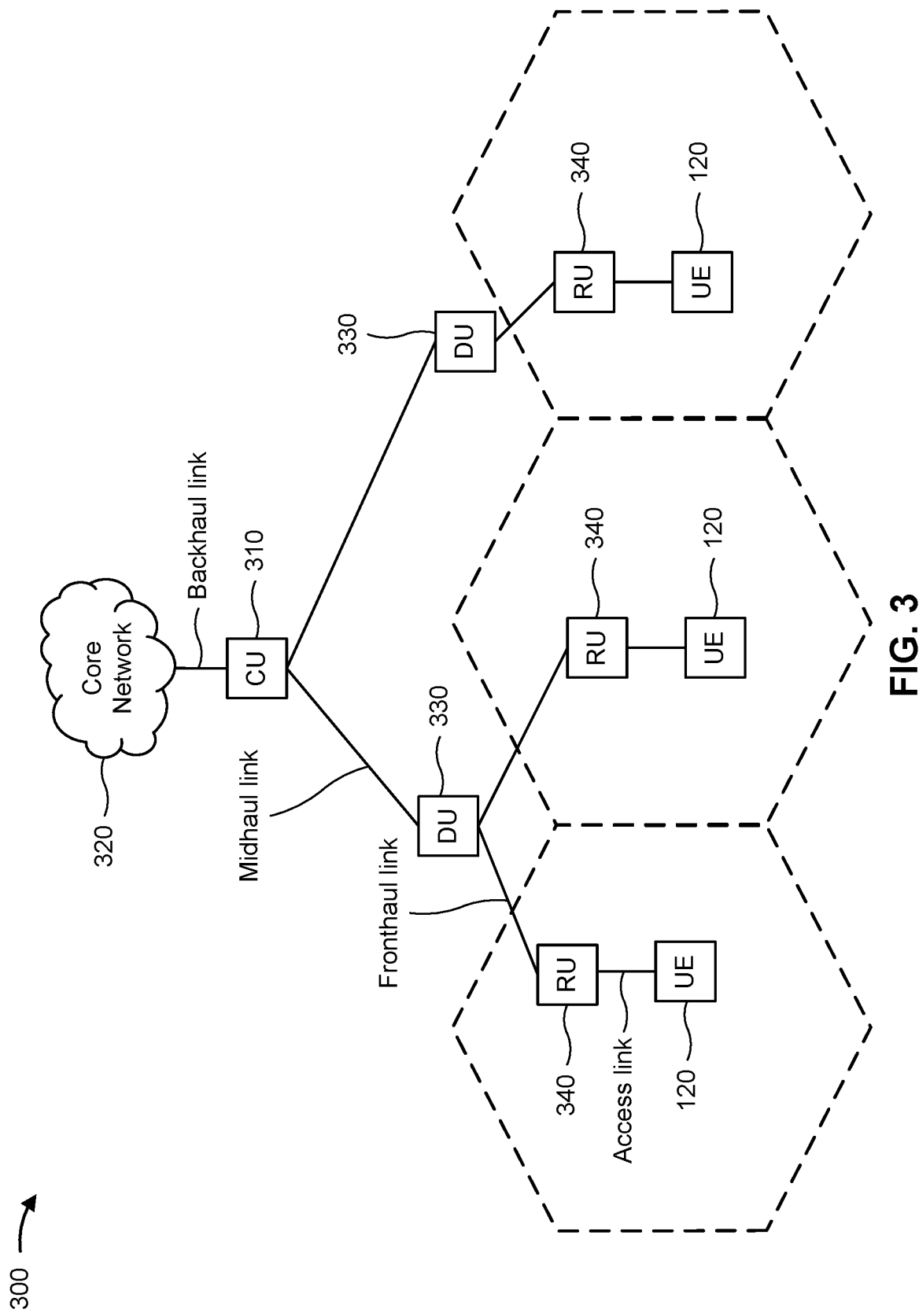
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
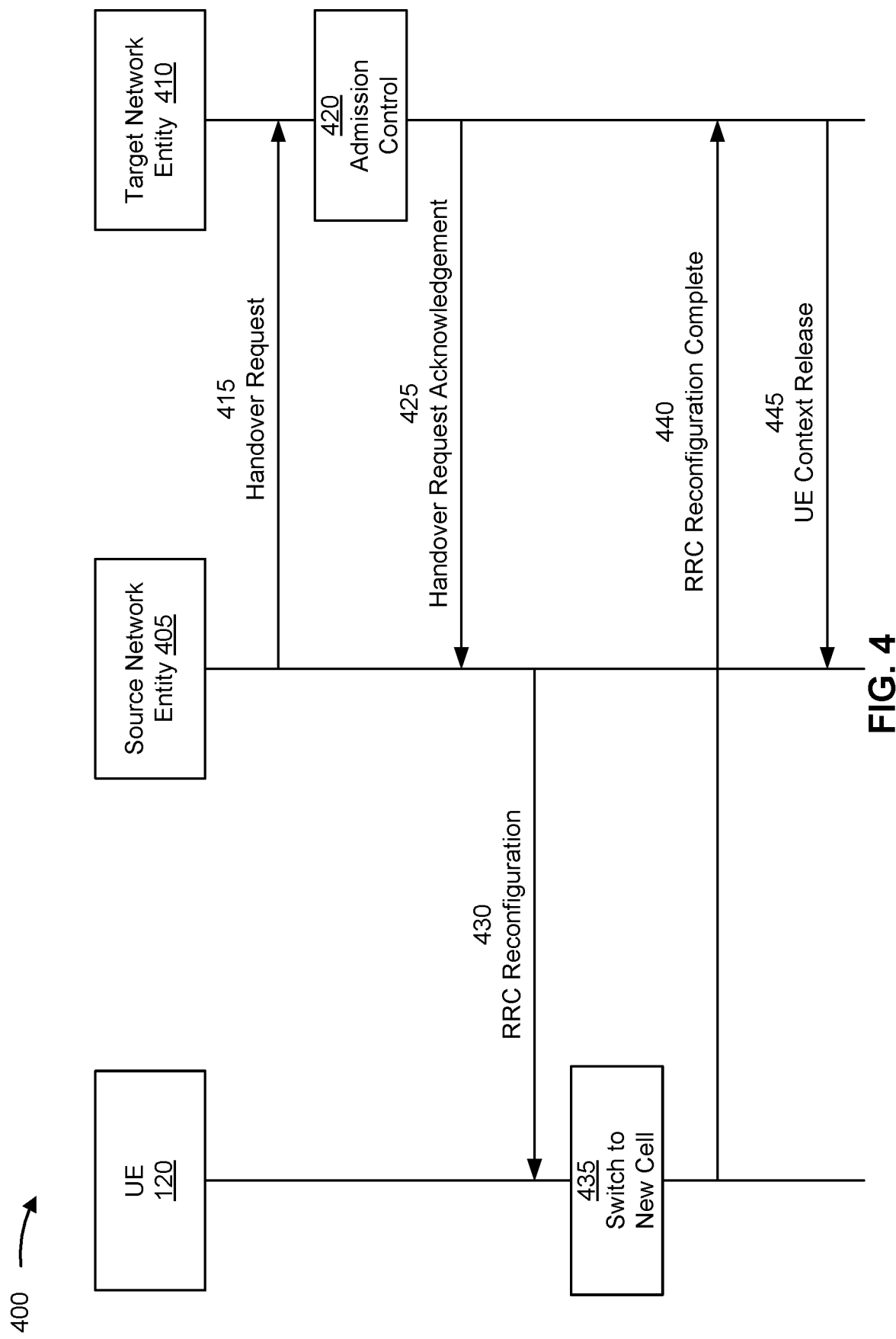
FIG. 4 is a diagram illustrating an example of a handover procedure, in accordance with the present disclosure.

FIG. 4 is a diagram illustrating an example of a handover procedure 400, in accordance with the present disclosure.

The handover procedure may be performed by a UE 120, a source network entity 405 (e.g., a base station 110, a CU 310, a DU 330, an RU 340, or a similar network entity), and a target network entity 410 (e.g., another base station 110, CU 310, DU 330, RU 340, or similar network entity). As used herein, "source network entity" may refer to a network entity associated with a serving cell or a network entity with which the UE 120 currently has an active or established connection, such as an RRC connection in a connected or active state. "Target network entity" may refer to a network entity associated with a cell that is identified as a cell to replace a serving cell for a UE 120 (e.g., as part of a handover procedure). In some examples, the source network entity 405 may be associated with a primary cell (PCell) or a special cell (SpCell) and the target network entity 410 may be associated with a target cell to replace the source network entity 405 as the PCell or the SpCell.

As shown in FIG. 4, and by reference number 415, the source network entity 405 may initiate handover of the UE 120 to the target network entity 410 by transmitting a handover request message to the target network entity 410. The source network entity 405 may transmit the handover request message to the target network entity 410 over an Xn, X2, or a next generation application protocol (NGAP) interface, among other examples. As shown by reference number 420, the target network entity 410 may perform admission control procedures associated with the handover based at least in part on receiving the handover request message. As shown by reference number 425, the target network entity 410 may transmit a handover request acknowledgement message to the source network entity 405 (e.g., if the admission control procedures indicate that the target network entity 410 can accept the handover of the UE 120). The handover request acknowledgement message may include an RRC configuration for connection to the target network entity 410.

As shown by reference number 430, the source network entity 405 may transmit the RRC configuration to the UE 120 by transmitting an RRC reconfiguration message to the UE 120 that includes the RRC configuration of the handover request acknowledgement message. As shown by reference number 435, the UE 120 may switch to the new cell (e.g., the cell associated with the target network entity 410) by changing an RRC connection from the source network entity 405 to the target network entity 410 based at least in part on the RRC reconfiguration. As shown by reference number 440, the UE 120 may transmit an RRC reconfiguration complete message to the target network entity 410. The RRC reconfiguration complete message may indicate that the UE 120 has changed the RRC connection from the source network entity 405 to the target network entity 410. As shown by reference number 445, the target network entity 410 may transmit a UE context release message to the source network entity 405. The UE context release message may indicate that the handover of the UE 120 to the target network entity 410 was successful.

In some examples, the UE 120 may be unable to successfully connect with the target network entity 410. For example, the UE 120 may attempt to connect with the target network entity 410 (e.g., by performing a random access channel (RACH) procedure with the target network entity 410), but the attempt to connect with the target network entity 410 may fail. If the UE 120 is unable to successfully connect with the target network entity 410, then the UE 120 may perform a connection re-establishment procedure to re-establish a connection with the source network entity 405 or another network entity. For example, the UE 120 may transmit an RRC re-establishment request message to the network (e.g., to the source network entity 405 or another network entity). Additionally, the UE 120 may reset a MAC entity of the UE 120, release the RRC configuration for the handover procedure, suspend all radio bearers (except a signaling radio bearer (SRB) indexed as SRB0, in some examples), release a connection with any configured secondary cells (SCells), or release all other configurations stored by the UE 120, among other examples. Therefore, the UE 120 may re-establish an RRC connection (e.g., with the source network entity 405 or another network entity) in the event that the handover procedure with the target network entity 410 fails.

As indicated above, FIG. 4 is provided as an example. Other examples may differ from what is described with regard to FIG. 4.

Figure 5:
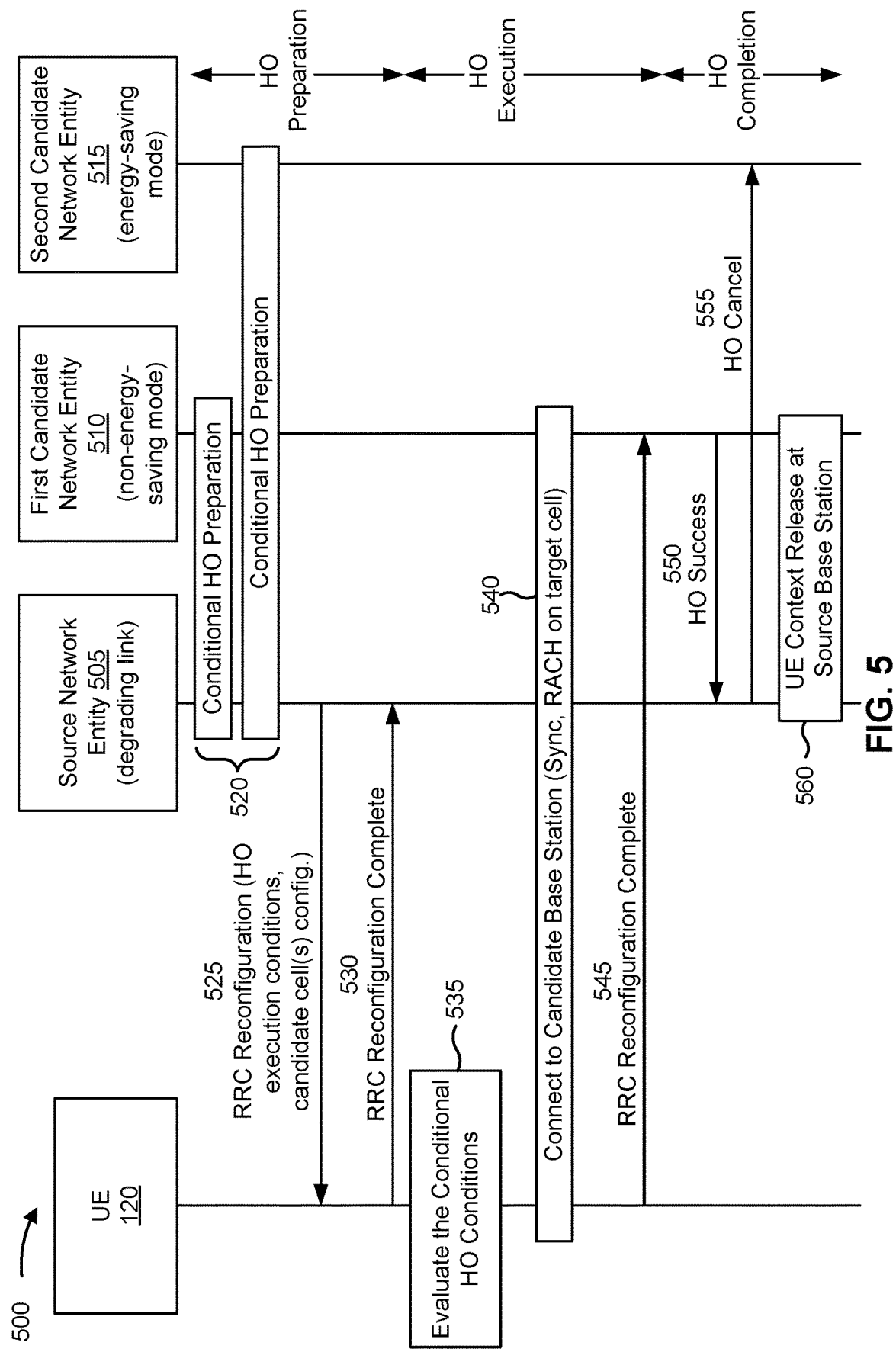
FIG. 5 is a diagram illustrating an example of a conditional handover procedure, in accordance with the present disclosure.

FIG. 5 is a diagram illustrating an example of a conditional handover procedure 500, in accordance with the present disclosure. Unlike the handover procedure described in connection with FIG. 4, for a conditional handover procedure, a UE (e.g., UE 120) may be pre-configured by a source network entity with certain handover conditions, and then may perform a handover procedure if certain of the handover conditions are met (sometimes referred to as being triggered). This may beneficially reduce handover latency as compared to the handover procedure described in connection with FIG. 4.

More particularly, the conditional handover procedure 500 shown in FIG. 5 may be performed by a UE 120, a source network entity 505 (e.g., a base station 110, a CU 310, a DU 330, a RU 340, the source network entity 405, or a similar network entity), and one or more candidate network entities 510, 515 (e.g., other base stations 110, CUs 310, DUs 330, RUs 340, or similar network entities). As used herein, "candidate network entity" may refer to a network entity that is a candidate to serve as a target network entity for the UE as part of a handover procedure. In some examples, the source network entity 505 may be associated with a PCell or an SpCell and the candidate network entities 510, 515 may be associated with a target cell to replace the source network entity 505 as a PCell or SpCell.

As shown in FIG. 5, and by reference number 520, the source network entity 505 may communicate with a first candidate network entity 510 and a second candidate network entity 515 to prepare the first and second candidate network entities 510, 515 for a conditional handover of the UE 120. For example, the source network entity 505 may transmit a handover request message to the first candidate network entity 510 or the second candidate network entity 515. The first candidate network entity 510 or the second candidate network entity 515 may transmit a handover request acknowledgement message to the source network entity 505, as described above in connection with FIG. 4. As shown by reference number 525, the source network entity 505 may transmit an RRC reconfiguration message to the UE 120. The RRC reconfiguration message may include a conditional handover configuration that indicates configurations for the candidate network entities 510, 515, indicates one or more criteria or execution conditions (e.g., conditional thresholds) that trigger handover, among other examples. As shown by reference number 530, the UE 120 may transmit an RRC reconfiguration complete message to the source network entity 505, which may indicate that the UE 120 has applied the RRC reconfiguration (e.g., the conditional handover configuration).

As shown by reference number 535, the UE 120 may evaluate the conditional handover conditions and/or detect a conditional handover event for the first candidate network entity 510. For example, the UE 120 may determine that the one or more criteria or execution conditions for triggering handover to the first candidate network entity 510 are satisfied (e.g., a measurement associated with a signal transmitted by the first candidate network entity 510 may satisfy a threshold or may be greater than (by a threshold amount) a measurement associated with a signal transmitted by the source network entity 505).

For example, in some aspects, the UE 120 may perform a handover procedure if one of the cells associated with the candidate network entities 510, 515 (sometimes referred to as a neighbor cell) becomes offset better than a serving cell (e.g., an SpCell), such as a cell associated with the source network entity 505 (sometimes referred to as event A3). Put another way, event A3 provides a handover triggering mechanism based upon relative measurement results, such as when the RSRP, RSRQ, signal-to-interference-plus-noise ratio (SINR), or similar measurement of a neighbor cell is stronger than the RSRP, RSRQ, SINR, or similar measurement of the SpCell. In some aspects, an event A3 handover to a neighbor cell may be triggered according to the condition $Mn+Ofn+Ocn-Hys>Mp+Ofp+Ocp+Off$ (sometimes referred to as the trigger condition or entering condition), and handover to the neighbor cell may be cancelled according to the condition Mn+Ofn+Ocn+Hys<Mp+Ofp+Ocp+Off (sometimes referred to as the cancellation condition or leaving condition), where Mn is the measurement result of the neighboring cell (e.g., RSRP, RSRQ, SINR, or the like), Ofn is the measurement object specific offset of a reference signal of the neighbor cell, Ocn is the cell specific offset of the neighbor cell, Hys is the hysteresis parameter associated with the triggering event, Mp is the measurement result of the SpCell (e.g., RSRP, RSRQ, SINR, or the like), Ofp is the measurement object specific offset of the SpCell, Ocp is the cell specific offset of the SpCell, and Off is the offset parameter associated with the triggering event.

In some other aspects, UE 120 may perform a handover procedure if the cell associated with the source network entity 505 (e.g., the SpCell) becomes worse than a first threshold value, and one of the cells associated with the candidate network entities 510, 515 (e.g., one of the neighbor cells) becomes better than a second threshold value (sometimes referred to as event A5). In some aspects, an event A5 handover to a neighbor cell may be triggered according to the equations Mp+Hys<Thresh1 and Mn+Ofn+Ocn−Hys>Thresh2 (e.g., the trigger condition or entering condition), and handover to the neighbor cell may be cancelled according to the equation Mp−Hys>Thresh1 and Mn+Ofn+Ocn+Hys<Thresh2 (e.g., the cancellation condition or leaving condition), where Thresh1 is a first threshold parameter and Thresh2 is a second threshold parameter.

In some aspects, the UE 120 may detect a conditional handover event for more than one cell associated with a candidate network entity (e.g., for both the cell associated with the first candidate network entity 510 and the cell associated with the second candidate network entity 515). In such aspects, the UE 120 may select one of the triggered cells as a selected cell for conditional reconfiguration execution. For example, the UE 120 may select a cell based at least in part on a beam and/or beam quality associated with each triggered cell (e.g., the UE 120 may select a cell associated with a preferred beam and/or having a higher beam quality).

As shown by reference number 540, the UE 120 may change an RRC connection from the source network entity 505 to the first candidate network entity 510, as described above in connection with FIG. 4, based at least in part on detecting the conditional handover event or execution condition for the first candidate network entity 510. That is, the UE 120 may execute the handover upon detecting the conditional handover event, and not wait for an RRC reconfiguration message from the source network entity 505. Put another way, the UE 120 may apply the stored configuration corresponding to the selected candidate cell and synchronize to the candidate cell. This may reduce handover latency as compared to the handover procedure described in connection with FIG. 4.

As shown by reference number 545, the UE 120 may transmit an RRC reconfiguration complete message to the first candidate network entity 510. The RRC reconfiguration complete message may indicate that the UE 120 has changed an RRC connection from the source network entity 505 to the first candidate network entity 510, as described above in connection with FIG. 4. As shown by reference number 550, the first candidate network entity 510 may transmit a handover success message (e.g., indicating successful handover of the UE 120) to the source network entity 505. As shown by reference number 555, the source network entity 505 may transmit a handover cancel message to the second candidate network entity 515. The handover cancel message may indicate that the second candidate network entity 515 is to discard the handover request message (e.g., transmitted as described in connection with reference number 520). As shown by reference number 560, the source network entity 505 and the first candidate network entity 510 may perform a UE context release procedure to release the UE 120 context at the source network entity 505.

In a similar manner as described above in connection with FIG. 4, the UE 120 may be unable to establish a connection with the first candidate network entity 510. For example, the handover procedure with the first candidate network entity 510 may fail. In some examples, the UE 120 may attempt to perform a RACH procedure with the first candidate network entity 510, but the RACH procedure may be unsuccessful. In some examples, rather than releasing one or more (or all) RRC configurations at the UE 120 when the handover procedure with the first candidate network entity 510 fails, the UE 120 may maintain the conditional handover configuration. This may enable the UE 120 to continue to search for or measure candidate network entities indicated by the conditional handover configuration. For example, the UE 120 may detect a conditional handover event for the second candidate network entity 515. For example, the UE 120 may determine that the one or more criteria or execution condition(s) for triggering handover to the second candidate network entity 515 are satisfied (e.g., after the handover attempt with the first candidate network entity 510 fails). Because the UE 120 has not released the conditional handover configuration, the UE 120 may change an RRC connection from the source network entity 505 to the second candidate network entity 515, as described above in connection with FIG. 4, based at least in part on detecting the conditional handover event for the second candidate network entity 515. That is, the UE 120 may execute the handover upon detecting that an execution condition is satisfied, and not wait for an RRC reconfiguration message from the source network entity 505. Moreover, the UE 120 may not wait for an additional conditional handover reconfiguration after the handover attempt with the first candidate network entity 510 fails. This may reduce handover latency associated with conditional handovers.

In some aspects, the conditional handover conditions described in connection with reference number 535 may be more difficult to satisfy for one candidate cell as compared to another candidate cell. For example, one or both of the candidate cells may be associated with a 5G RAT implementing millimeter wave technology, which may consume large amounts of power to operate the various antenna panels and subpanels and associated power amplifiers and subsystems used for beamforming and/or other directional transmission technologies. During periods of decreased cell activity or the like, the cells may thus be capable of operating in an energy-saving mode, such as by reducing an amount of antenna panels, subpanels, or ports used to serve UEs, thereby continuing some wireless communication capabilities and/or transmissions but with a reduced power consumption and reduced activity (e.g., the cell may be discoverable by a UE and/or a UE may be capable of connecting to the cell, but the cell may have limited communication capabilities as compared to a cell operating in a non-energy-saving mode, sometimes referred to as a normal mode).

Returning to the example shown in FIG. 5, in some aspects, the first candidate network entity 510 may be associated with a first cell operating in a non-energy-saving mode or normal mode, and the second candidate network entity 515 may be associated with a second cell operating in an energy-saving mode. In such aspects, the conditional handover conditions described in connection with reference number 535 may be configured such that the conditions associated with the second candidate cell (e.g., a cell operating in an energy-saving mode) are difficult to satisfy, thereby discouraging the UE 120 from connecting to the second candidate cell. Put another way, the conditional handover conditions may be configured such that the second candidate cell, operating in the energy-saving mode, serves primarily as a backup that is selected by the UE 120 only when the serving cell has significantly deteriorated and there are no other suitable candidate cells for connection (e.g., there are no other suitable candidate cells associated with conditional handover conditions, such as event A3 or A5 described above, that have been triggered).

In some aspects, a threshold, offset, or the like associated with the second candidate cell operating in the energy-saving mode may be higher than a corresponding threshold, offset, or the like associated with the first candidate cell operating in the non-energy-saving mode, such that the conditional handover condition associated with the first candidate cell is more easily triggered and thus the UE 120 is more likely to perform a handover procedure to the first candidate cell, operating in the non-energy-saving mode. Additionally, or alternatively, a time-to-trigger (e.g., a minimum amount of time that a certain condition must be met before a handover procedure is initiated by the UE 120) associated with the second candidate cell operating in the energy-saving mode may be higher than a corresponding time-to-trigger associated with the first candidate cell operating in the non-energy-saving mode, such that the conditional handover condition associated with the first candidate cell is more easily triggered and thus the UE 120 is more likely to perform a handover procedure to the first candidate cell, operating in the non-energy-saving mode. In this way, when configuring the UE 120 with the various conditional handover conditions, the source network entity 505 may adjust thresholds, offsets, times-to-trigger, or the like based on operating modes of the corresponding cells in order to control which candidate cells the UE 120 is likely to connect with when performing a handover procedure.

However, configuring a threshold, offset, time-to-trigger, or the like associated with a candidate cell operating in an energy-saving mode that is too high (e.g., too difficult to satisfy) may result in no suitable cells for connection. More particularly, in some aspects, a link with a serving cell may degrade, requiring that the UE 120 perform a handover procedure to one of the candidate cells. If the first candidate cell, associated with the normal mode, is a good link (e.g., if the conditional handover conditions associated with the first candidate cell are met), then the UE 120 may perform the handover procedure with the first candidate cell and thus connect to the first candidate network entity 510. However, if the first candidate cell, associated with the non-energy-saving mode, is a bad link (e.g., if the conditional handover conditions associated with the first candidate cell are not met), then the UE 120 may evaluate other cells, such as the second candidate cell, which is associated with the energy-saving mode and thus harder-to-satisfy conditional handover conditions. Because a threshold, offset, time-to-trigger, or the like associated with the second candidate cell may have been configured as difficult to satisfy because the second candidate cell is operating in the energy-saving mode, the conditional handover conditions may not be satisfied for the second candidate cell. In such aspects, the UE 120 will not execute handover to the first candidate cell because the link is bad, and will not execute handover to the second candidate cell because the conditional handover conditions cannot be met. Thus, as the serving cell continues to degrade with no suitable handover candidate, the UE 120 may experience interrupted, unreliable service and ultimately radio link failure.

Some techniques and apparatuses described herein enable conditional handover configurations that disincentivize a UE (e.g., UE 120) from selecting a candidate cell operating in an energy saving mode when other suitable cells are available, but which enables the UE to connect to the second candidate cell when no other suitable candidate cells exist, thereby avoiding adverse impacts to the UE's performance, such as radio link failure. More particularly, in some aspects, a UE may receive a configuration of conditional handover conditions associated with a candidate cell and an indication of an operating mode associated with the candidate cell (e.g., whether the candidate cell is operating in a non-energy-saving mode or an energy-saving mode), and the UE may perform a conditional handover procedure based at least in part on the configuration of the conditional handover conditions and the indication of the operating mode. In some aspects, performing the conditional handover procedure based at least in part on the configuration of the conditional handover conditions and the indication of the operating mode may include the UE prioritizing selection of a non-energy-saving cell over an energy-saving cell, yet may enable the UE to select an energy-saving cell if no other suitable cells exist. In this way, the UE may more readily execute handover to a candidate cell operating in an energy-saving mode when the energy-saving cell is the best option, thereby avoiding interruption of service and radio link failure, and overall improving the reliability of wireless communications.

As indicated above, FIG. 5 is provided as an example. Other examples may differ from what is described with regard to FIG. 5.

Figure 6:
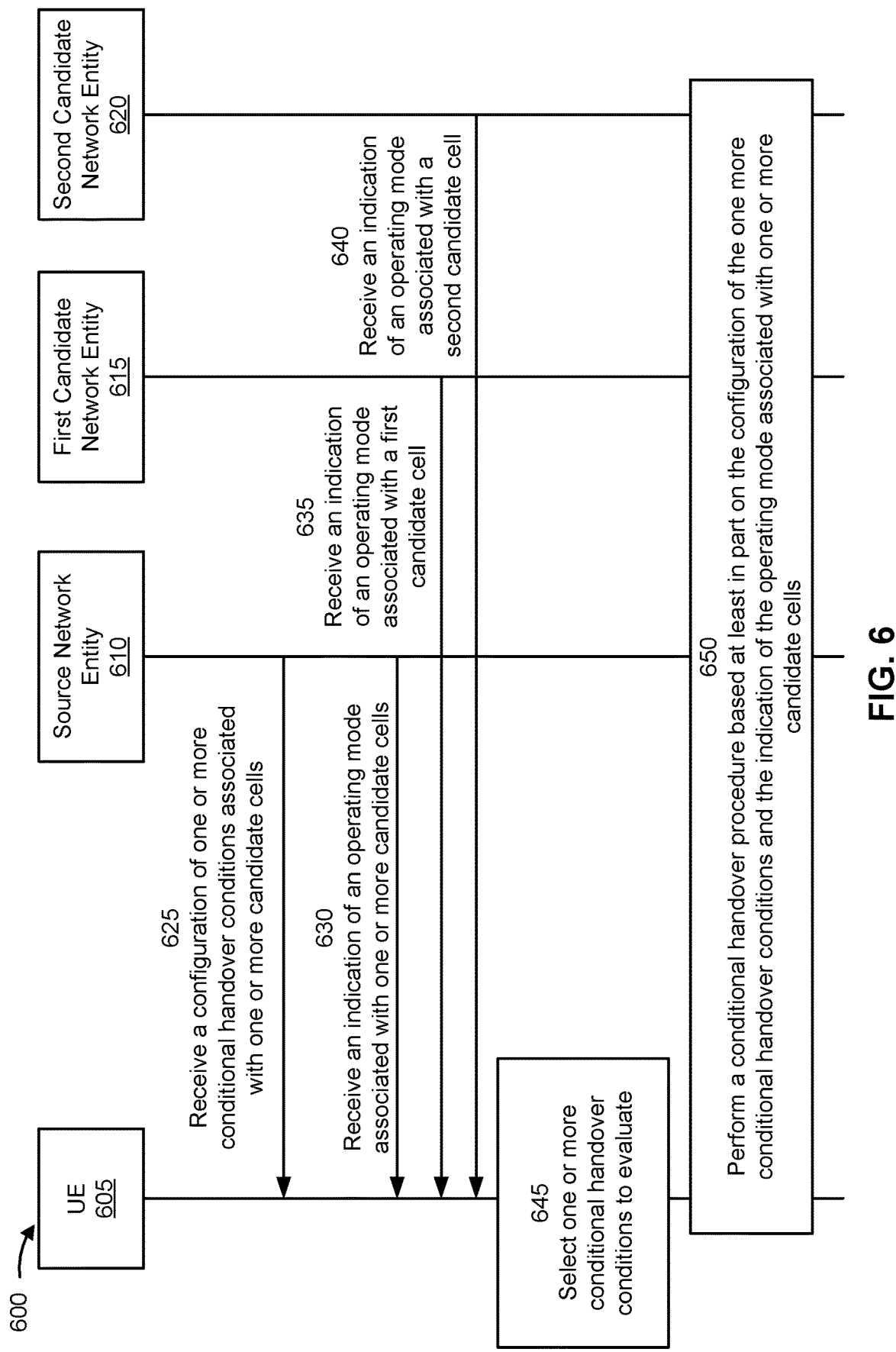
FIG. 6 is a diagram illustrating an example associated with selection of an energy-saving cell for conditional handover, in accordance with the present disclosure.

FIG. 6 is a diagram illustrating an example 600 associated with selection of an energy-saving cell for conditional handover, in accordance with the present disclosure. As shown in FIG. 6, a UE 605 (e.g., UE 120), a source network entity 610 (e.g., source network entity 505), a first candidate network entity 615 (e.g., first candidate network entity 510), and a second candidate network entity 620 (e.g., second candidate network entity 515) may communicate with one another. In some aspects, the UE 605, the source network entity 610, the first candidate network entity 615, and the second candidate network entity 620 may be part of a wireless network (e.g., wireless network 100). The UE 605 and the source network entity 610 may have established a wireless connection prior to operations shown in FIG. 6. Similar to the aspects described in connection with FIG. 5, in some aspects, the source network entity 610 may be associated with a serving cell (e.g., an SpCell), the first candidate network entity 615 may be associated with a first candidate cell for conditional handover, and the second candidate network entity 620 may be associated with a second candidate cell for conditional handover. In some aspects, the first candidate network entity 615 and/or the first candidate cell may be associated with one operating mode (e.g., one of a non-energy-saving mode or an energy-saving mode), and the second candidate network entity 620 and/or the second candidate cell may be associated with a different operating mode (e.g., the other one of the non-energy-saving mode or the energy-saving mode).

As shown by reference number 625, the UE 605 may receive, from the source network entity 610, configuration information. In some aspects, the UE 605 may receive the configuration information via one or more of an RRC message, a system information block (SIB) message, and/or a MAC control element (MAC-CE) message, among other examples. In some aspects, the configuration information may include an indication of one or more configuration parameters (e.g., already known to the UE 605 and/or previously indicated by the source network entity 610 or another network device) for selection by the UE 605, and/or explicit configuration information for the UE 605 to use to configure the UE 605, among other examples. The UE 605 may configure itself based at least in part on the configuration information. In some aspects, the UE 605 may be configured to perform one or more operations described herein based at least in part on the configuration information.

In some aspects, the configuration information may include a configuration of one or more conditional handover conditions associated with one or more candidate cells such as the first candidate cell associated with the first candidate network entity 615 and/or the second candidate cell associated with the second candidate network entity 620. In some aspects, the one or more conditional handover conditions associated with one more candidate cells may include thresholds, offsets, times-to-trigger, or similar parameters associated with measurements performed by the UE 120 (e.g., RSRP measurements, RSRQ measurements, SINR measurements, or the like) on various candidate cells, as described above in connection with FIG. 5.

Moreover, in some aspects, the one or more conditional handover conditions may be associated with an operating mode of a corresponding candidate cell. For example, a first set of one or more conditional handover conditions may be associated with an operating mode of the first candidate cell, and/or a second set of one or more conditional handover conditions may be associated with an operating mode of the second candidate cell. More particularly, each candidate cell may be operating in one of an energy-saving mode or an non-energy-saving mode, and the source network entity 610 may configure the one or more conditional handover conditions accordingly. For example, the source network entity 610 may configure one or more thresholds, offsets, times-to-trigger, or the like such that the conditional handover conditions are more difficult to satisfy when a corresponding cell is operating in the energy-saving mode than the conditional handover conditions would be when the corresponding cell is operating in the non-energy saving mode.

In some aspects, the configuration of the one or more conditional handover conditions may be cell-specific. For example, a first set of the one or more conditional handover conditions may be specific to the first candidate cell, while a second set of the one or more conditional handover conditions may be specific to the second candidate cell, and so forth. However, in some other aspects, the one or more conditional handover conditions may apply to multiple candidate cells associated with a common attribute. For example, a set of the one or more conditional handover conditions may apply to multiple candidate cells operating in a corresponding operating mode, and/or to multiple candidate cells operating in a corresponding frequency range, or the like.

In some aspects, the configuration of the one or more conditional handover conditions may include a configuration of multiple handover condition thresholds associated with a candidate cell. In some aspects, each of the multiple handover condition thresholds may correspond to a respective mode of operation. For example, the configuration may include a first threshold associated with the candidate cell when the candidate cell is operating in a non-energy-saving mode, and a second threshold associated with the candidate cell when the candidate cell is operating in the energy-saving mode. In some other aspects, each of the multiple handover condition thresholds may correspond to an availability of other candidate cells for connection. For example, the configuration may include a first threshold to use when other candidate cells are available for connection, and a second threshold to use when no other candidate cells are available for selection. In this way, the UE 120 may select appropriate conditions when measuring a link of a candidate cell, as described in more detail below in connection with reference number 640.

As shown by reference numbers 630, 635, and 640, the UE 605 may receive an indication of an operating mode associated with a candidate cell, such as the first candidate cell and/or the second candidate cell. More particularly, in some aspects, the UE 605 may receive an indication of an operating mode associated with the first candidate cell and/or the second candidate cell from the source network entity 610, as shown by reference number 630. In such aspects, the indication may be received as part of the configuration information described in connection with reference number 625, or else may be received in another message, such as an RRC message, a MAC-CE message, a downlink control information (DCI) message, or the like. Additionally, or alternatively, the indication of an operating mode associated with a candidate cell may be received from a candidate cell itself (e.g., from a network entity associated with a candidate cell). For example, the UE 605 may receive an indication of an operating mode associated with the first candidate cell from the first candidate network entity 615, as shown by reference number 635, and/or the UE 605 may receive an indication of an operating mode associated with the second candidate cell from the second candidate network entity 620, as shown by reference number 640. In some aspects, the indication of the operating mode associated a corresponding candidate cell may include an indication of whether the corresponding candidate cell is operating in one of a non-energy-saving mode or an energy-saving mode.

By receiving an indication of an operating mode of at least one candidate cell, the UE 605 may prioritize selection of a candidate cell operating in a non-energy-saving mode for executing a conditional handover procedure over a candidate cell operating in an energy-saving mode. In that regard, in some aspects, conditional handover conditions associated with a first candidate cell and a second candidate cell may be the same or similar (e.g., a threshold, offset, time-to-trigger, or the like associated with the first candidate cell may be similar to a threshold, offset, time-to-trigger, or the like associated with the second candidate cell) in order to avoid the issue where no suitable candidate cell is selected because an energy-saving cell is configured with too-high thresholds or the like, as described in connection with FIG. 5. Nonetheless, the UE 605 may still prioritize selection of a non-energy-saving cell over an energy-saving cell, because the UE 605 may be provided with an indication of an operating mode of the various candidate cells and select a non-energy-saving candidate cell, if available.

In some aspects, the UE 605 may receive priority values associated with the various candidate cells, and thus may perform a conditional handover procedure based at least in part on the priority values. For example, one or more of the indications described in connection with reference numbers 630, 635, and 640 may include an indication of a selection priority value associated with a corresponding candidate cell. In some aspects, the UE 605 may prioritize candidate cells for conditional handover based at least in part on the selection priority values. For example, in aspects in which the first candidate cell is associated with a first selection priority value that is higher than a second selection priority value associated with a second candidate cell, the UE 605 may first perform measurements on the first candidate cell or otherwise first evaluate the first candidate cell to determine if conditional handover conditions have been met, and may only perform measurements on the second candidate cell or otherwise evaluate the second candidate cell if the first candidate cell is not suitable for handover. Additionally, or alternatively, in some aspects the UE may perform measurements on both the first candidate cell and the second candidate cell, and if both the first candidate cell and the second candidate cell fulfill their corresponding selection criteria, the UE 605 may select the candidate cell associated with the higher selection priority value. Additionally, or alternatively, in some aspects the UE may perform measurements on both the first candidate cell and the second candidate cell, and if a difference between a measurement associated with the first candidate cell a measurement associated with the second candidate cell is less than a threshold, the UE 605 may select the candidate cell associated with the higher selection priority value.

As shown by reference number 645, in some aspects, the UE 605 may select one or more conditional handover conditions for conditional handover evaluation (e.g., to determine if a conditional handover triggering event, such as event A3 or event A5, has occurred). For example, as described above in connection with reference number 625, for a given candidate cell, the UE 605 may be configured with multiple sets of conditional handover conditions, multiple conditional handover thresholds, multiple conditional handover offsets, multiple times-to-trigger, or the like, and thus the UE 605 may select a set of conditional handover conditions, a conditional handover threshold, a conditional handover offset, a time-to-trigger, or the like for conditional handover evaluation based at least in part on an operating mode of the candidate cell, the availability of other candidate cells, or other factors.

For example, in some aspects, the configuration information described in connection with reference number 625 may include a configuration of multiple handover condition thresholds associated with a candidate cell, which may correspond to a measurement threshold (e.g., RSRP, RSRQ, SINR, or the like), a time-to-trigger threshold, or a similar threshold. Moreover, in some aspects, the handover condition thresholds may be frequency dependent (e.g., a first threshold or set of thresholds may apply to candidate cells operating in a first frequency range, a second threshold or set of thresholds may apply to candidate cells operating in a second frequency range, and so forth).

In some aspects, the UE 605 may select a handover condition threshold, of the multiple handover condition thresholds, to be used for conditional handover evaluation based at least in part on the availability of other candidate cells for the conditional handover procedure. More particularly, the first candidate cell may be associated with an energy-saving mode and the second candidate cell may be associated with a non-energy-saving mode, and the UE 605 may be configured with at least two handover condition thresholds associated with the first candidate cell: a first handover condition threshold that is difficult to satisfy, and a second handover condition threshold that is more easily satisfied. In such aspects, when other candidate cells are available for selection, such as the second candidate cell operating in the non-energy-saving mode, the UE 605 may use the first, difficult to satisfy threshold, making it unlikely that the first candidate cell will be selected for conditional handover. However, when other candidate cells are not available for selection, the UE 605 may use the second, easier to satisfy threshold, making it more likely that the first candidate cell will be selected for conditional handover. Put another way, the UE 605 may select a first handover condition threshold when at least one other candidate cell operating in a non-energy-saving mode is available for the conditional handover procedure, and the UE 605 may select a second handover condition threshold (which may be less than the first handover condition threshold) when no other candidate cells operating in a non-energy-saving mode are available for the conditional handover procedure. In this way, radio link failure may be avoided because the UE 605 is able to connect to the energy-saving cell using lower thresholds when no other suitable candidate cell exists.

Additionally, or alternatively, one or more of the candidate cells may be configured to dynamically change between operating modes (e.g., between an energy-saving mode and a non-energy-saving mode), and the configuration information described in connection with reference number 625 may include a configuration of multiple handover condition thresholds, each associated with a corresponding operating mode. As described above, the multiple handover condition thresholds may correspond to a measurement threshold (e.g., RSRP, RSRQ, SINR, or the like), a time-to-trigger threshold, or a similar threshold, and/or may be frequency dependent. The configuration information may include a first handover condition threshold associated with the first candidate cell when the first candidate cell is operating in a non-energy-saving mode, and the configuration information may include a second handover condition threshold associated with the first candidate cell when the first candidate cell is operating in an energy-saving mode. In such aspects, the UE 605 may select which threshold to use for evaluating conditional handover conditions based at least in part on an operating mode of the candidate cell (e.g., based at least in part on the indication of the operating mode of the candidate cell described in connection with reference numbers 630, 635, and 640). Or, put another way, in aspects in which the operating mode associated with a candidate cell is permitted to change dynamically, the UE 605 may select a handover condition threshold based at least in part on receiving the indication of the operating mode associated with the corresponding candidate cell.

As shown by reference number 650, the UE 605, the source network entity 610, the first candidate network entity 615, and/or the second candidate network entity 620 may perform a conditional handover procedure based at least in part on the configuration of the one or more conditional handover conditions and the indication of the operating mode associated with at least one candidate cell. In some aspects, the conditional handover procedure may be associated with a handover of the UE 605 from an SpCell to a new SpCell (sometimes referred to simply as a conditional handover (CHO)), while, in some other aspects, the conditional handover procedure may be associated with a handover of the UE 605 from a primary secondary cell group (SCG) cell (PSCell) to a new PSCell (sometimes referred to as a conditional PSCell change (CPC)). For example, in response to determining that one or more conditional handover conditions have been met, the UE 605 may leave the source network entity 610 and may connect with one of the first candidate network entity 615 or the second candidate network entity 620 using a substantially similar procedure as that described in connection with FIG. 5.

In some aspects, performing the conditional handover procedure may be based at least in part on the UE 605 determining that a certain triggering event has occurred, such as a triggering event associated with an A3 event and/or an A5 event, as described in connection with FIG. 5. Additionally, or alternatively, in some aspects, the configuration information described in connection with reference number 625 may include a configuration of at least one handover condition threshold associated with at least one candidate cell, with the at least one handover condition threshold being associated with a measurement of a link between the UE 605 and a corresponding candidate cell (e.g., Thresh1 or Thresh2 described above in connection with FIG. 5). For example, the at least one handover condition threshold may be associated with an RSRP measurement, an RSRQ measurement, an SINR measurement, or the like, such that when the RSRP measurement, the RSRQ measurement, the SINR measurement, or the similar measurement (which may be adjusted according to a configured offset or hysteresis parameter, such as Ofn, Ocn, Off Hys, or the like) exceeds the handover condition threshold, the UE 605 performs the conditional handover procedure to the candidate cell.

Additionally, or alternatively, performing the conditional handover procedure may be based at least in part on a comparison of a measurement of a first link between the UE 605 and the first candidate cell to a measurement of a second link between the UE 605 and a second candidate cell. For example, the UE 605 may perform a conditional handover procedure to one of the candidate cells based on a measurement associated with the one of the candidate cells being greater than a measurement associated with the other one of the candidate cells by a certain value, sometimes referred to as 6. For example, in some aspects, the UE 605 may select a cell operating in an energy-saving mode over a cell operating in a non-energy-saving mode if a measurement associated with the every-saving cell (which may be RSRP, RSRQ, SINR, or the like) is greater than a corresponding measurement associated with a non-energy-saving cell (e.g., RSRP, RSRQ, SINR, or the like) by a certain value (e.g., 6). For example, in some aspects, the first candidate cell may be associated with an energy-saving mode, and the second candidate cell may be associated with a non-energy saving mode. In such aspects, if both candidate cells are triggered (e.g., if conditional handover conditions associated with both candidate cells are met), the UE 605 may, in some instances, select the energy-saving candidate cell. For example, the UE 605 may select the first candidate cell over the second candidate cell when a measurement associated with the first candidate cell (sometimes referred to as $M_1$) is greater than a corresponding measurement associated with second candidate cell (sometimes referred to as $M_2$) by a certain value (e.g., $M_2-M_1>\delta$). In some other aspects, the UE 605 may select the first candidate cell over the second candidate cell when a measurement associated with first candidate cell (e.g., $M_1$) is greater than a first value (e.g., $\delta_1$) and a measurement associated with second candidate cell (e.g., $M_2$) is less than a second value (e.g., $\delta_2$). In such aspects, the second value may be less than the first value (e.g., $\delta_1>\delta_2$).

Based at least in part on UE 605 and/or one or more of the network entities 610, 615, or 620 performing the conditional handover procedure as described herein, the UE 605 and/or one or more of the network entities 610, 615, or 620 may conserve computing, power, network, and/or communication resources that may have otherwise been consumed by a conventional conditional handover procedure. For example, based at least in part on the UE 605 and/or one or more of the network entities 610, 615, or 620 performing a conditional handover procedure that enables connection to an energy-saving cell under certain conditional handover conditions, the UE 605 and/or one or more of the network entities 610, 615, or 620 may communicate with a reduced error rate and/or avoid radio link failure, which may conserve computing, power, network, and/or communication resources that may have otherwise been consumed to detect and/or correct communication errors and/or reestablish a connection after radio link failure.

As indicated above, FIG. 6 is provided as an example. Other examples may differ from what is described with respect to FIG. 6.

Figure 7:
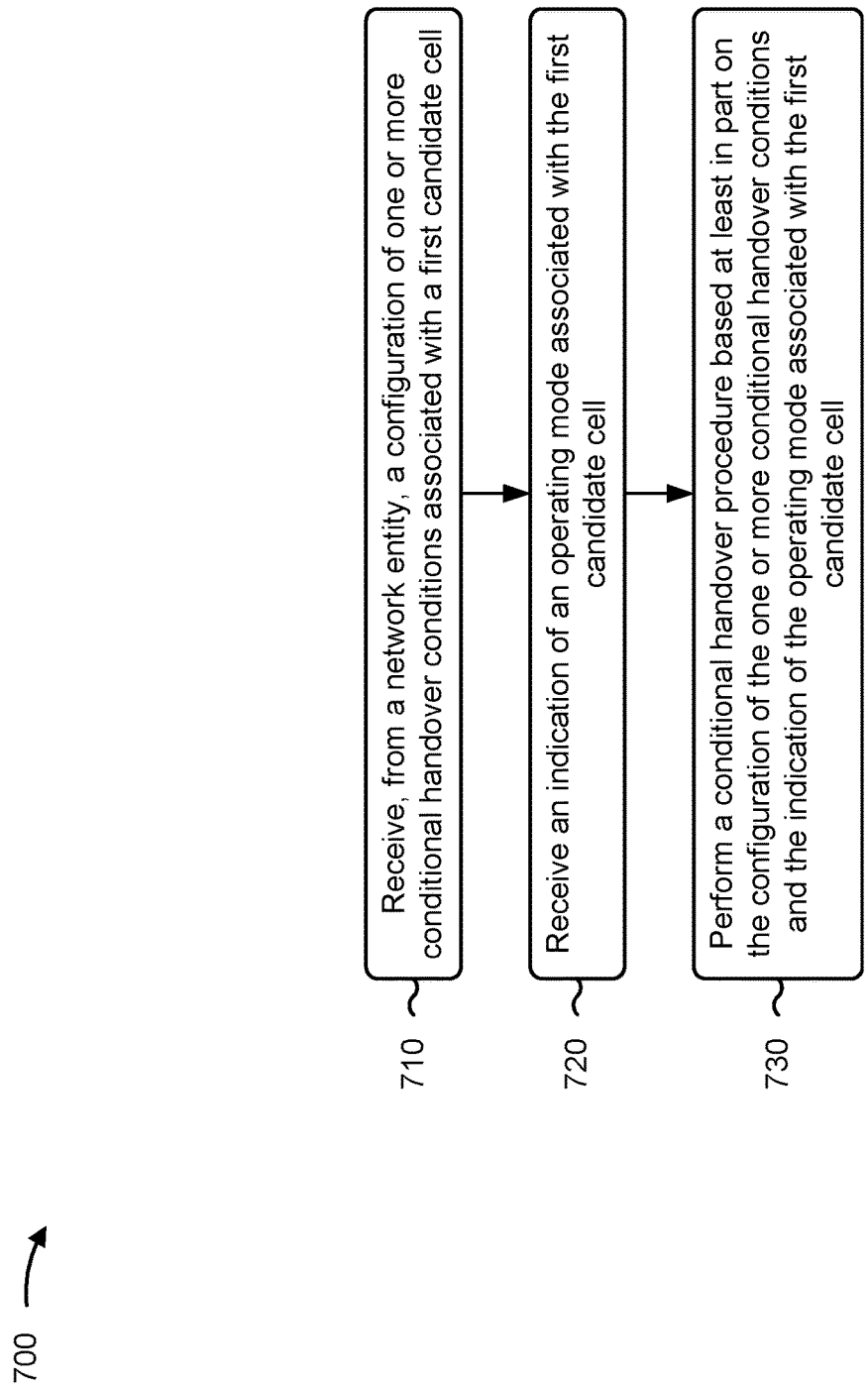
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 605) performs operations associated with selection of an energy-saving cell for conditional handover.

As shown in FIG. 7, in some aspects, process 700 may include receiving, from a network entity (e.g., source network entity 610), a configuration of one or more conditional handover conditions associated with a first candidate cell (block 710). For example, the UE (e.g., using communication manager 908 and/or reception component 902, depicted in FIG. 9) may receive, from a network entity, a configuration of one or more conditional handover conditions associated with a first candidate cell, as described above.

As further shown in FIG. 7, in some aspects, process 700 may include receiving an indication of an operating mode associated with the first candidate cell (block 720). For example, the UE (e.g., using communication manager 908 and/or reception component 902, depicted in FIG. 9) may receive an indication of an operating mode associated with the first candidate cell, as described above.

As further shown in FIG. 7, in some aspects, process 700 may include performing a conditional handover procedure based at least in part on the configuration of the one or more conditional handover conditions and the indication of the operating mode associated with the first candidate cell (block 730). For example, the UE (e.g., using communication manager 908 and/or conditional handover component 910, depicted in FIG. 9) may perform a conditional handover procedure based at least in part on the configuration of the one or more conditional handover conditions and the indication of the operating mode associated with the first candidate cell, as described above.

Process 700 may include additional aspects, such as any single aspect or any combination of aspects described below and/or in connection with one or more other processes described elsewhere herein.

In a first aspect, the indication of the operating mode associated with the first candidate cell includes an indication of whether the first candidate cell is operating in one of a non-energy-saving mode or an energy-saving mode.

In a second aspect, alone or in combination with the first aspect, the indication of the operating mode associated with the first candidate cell includes an indication of a selection priority value associated with the first candidate cell.

In a third aspect, alone or in combination with one or more of the first and second aspects, the one or more conditional handover conditions are associated with the operating mode of the first candidate cell.

In a fourth aspect, alone or in combination with one or more of the first through third aspects, the one or more conditional handover conditions are specific to the first candidate cell.

In a fifth aspect, alone or in combination with one or more of the first through fourth aspects, the one or more conditional handover conditions apply to at least one of multiple candidate cells operating in a corresponding operating mode, or multiple candidate cells operating in a corresponding frequency range.

In a sixth aspect, alone or in combination with one or more of the first through fifth aspects, the configuration of the one or more conditional handover conditions associated with the first candidate cell includes a configuration of multiple handover condition thresholds associated with the first candidate cell, and a handover condition threshold, of the multiple handover condition thresholds, is selected by the UE based at least in part on availability of other candidate cells for the conditional handover procedure.

In a seventh aspect, alone or in combination with one or more of the first through sixth aspects, a first handover condition threshold is selected when at least one other candidate cell operating in a non-energy-saving mode is available for the conditional handover procedure, a second handover condition threshold is selected when no other candidate cells operating in a non-energy-saving mode are available for the conditional handover procedure, and the second handover condition threshold is less than the first handover condition threshold.

In an eighth aspect, alone or in combination with one or more of the first through seventh aspects, the configuration of the one or more conditional handover conditions associated with the first candidate cell includes a configuration of multiple handover condition thresholds, each associated with a corresponding operating mode associated with the first candidate cell, the operating mode associated with the first candidate cell is permitted to change dynamically, and the handover condition threshold is selected based at least in part on receiving the indication of the operating mode associated with the first candidate cell.

In a ninth aspect, alone or in combination with one or more of the first through eighth aspects, performing the conditional handover procedure is based at least in part on a comparison of a measurement of a first link between the UE and the first candidate cell to a measurement of a second link between the UE and a second candidate cell.

In a tenth aspect, alone or in combination with one or more of the first through ninth aspects, the configuration of the one or more conditional handover conditions associated with the first candidate cell includes a configuration of at least one handover condition threshold associated with the first candidate cell, and the at least one handover condition threshold is associated with a measurement of a link between the UE and the first candidate cell.

In an eleventh aspect, alone or in combination with one or more of the first through tenth aspects, the configuration of the one or more conditional handover conditions associated with the first candidate cell includes a configuration of at least one handover condition threshold associated with the first candidate cell, and the at least one handover condition threshold is associated with a time-to-trigger a conditional event associated with the first candidate cell.

In a twelfth aspect, alone or in combination with one or more of the first through eleventh aspects, the configuration of the one or more conditional handover conditions associated with the first candidate cell is based at least in part on a frequency band associated with the first candidate cell.

In a thirteenth aspect, alone or in combination with one or more of the first through twelfth aspects, the conditional handover procedure is associated with a conditional primary secondary cell group cell change.

In a fourteenth aspect, alone or in combination with one or more of the first through thirteenth aspects, the configuration of the one or more conditional handover conditions associated with the first candidate cell is received via an RRC message, an SIB message, or a MAC-CE message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
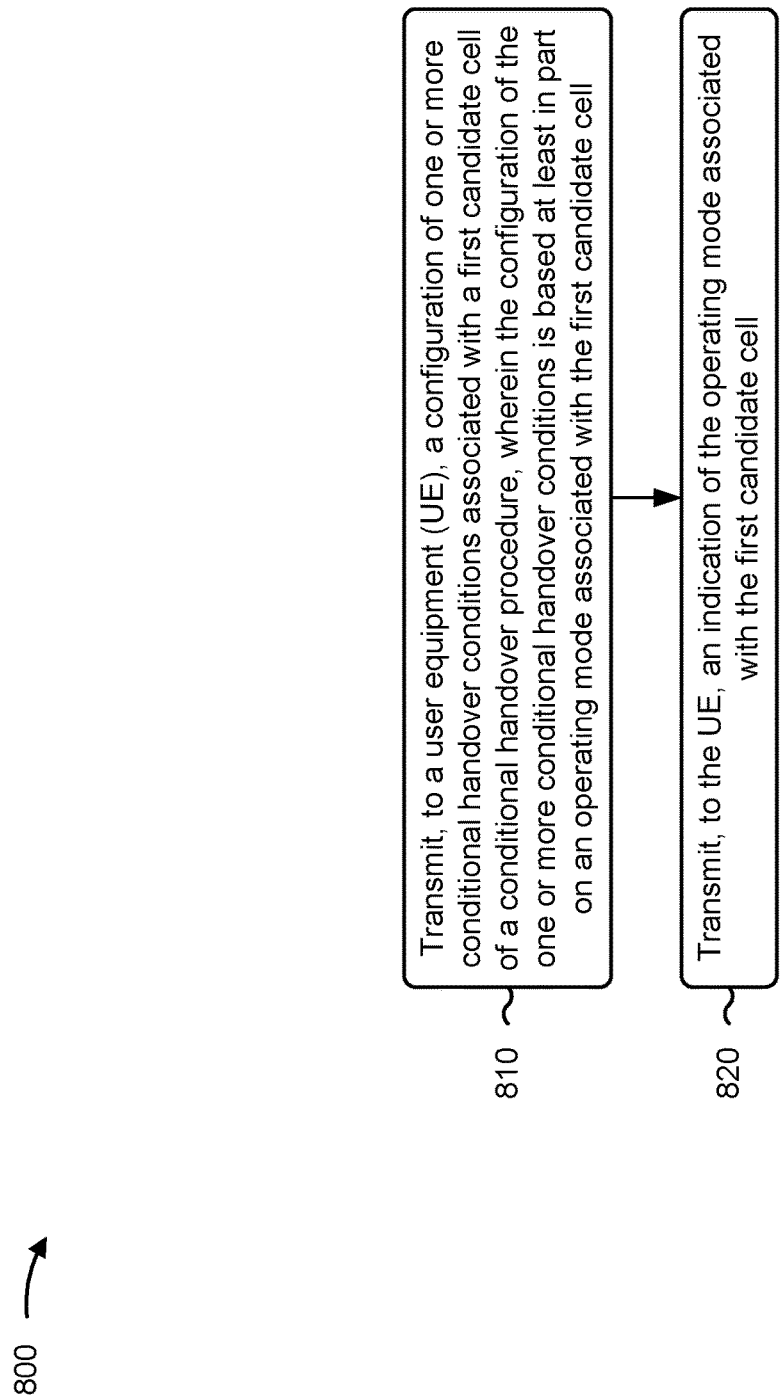
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., the source network entity 610) performs operations associated with selection of an energy-saving cell for conditional handover.

As shown in FIG. 8, in some aspects, process 800 may include transmitting, to a UE (e.g., UE 605), a configuration of one or more conditional handover conditions associated with a first candidate cell of a conditional handover procedure, wherein the configuration of the one or more conditional handover conditions is based at least in part on an operating mode associated with the first candidate cell (block 810). For example, the network entity (e.g., using communication manager 1008 and/or transmission component 1004, depicted in FIG. 10) may transmit, to a UE, a configuration of one or more conditional handover conditions associated with a first candidate cell of a conditional handover procedure, wherein the configuration of the one or more conditional handover conditions is based at least in part on an operating mode associated with the first candidate cell, as described above.

As further shown in FIG. 8, in some aspects, process 800 may include transmitting, to the UE, an indication of the operating mode associated with the first candidate cell (block 820). For example, the network entity (e.g., using communication manager 1008 and/or transmission component 1004, depicted in FIG. 10) may transmit, to the UE, an indication of the operating mode associated with the first candidate cell, as described above.

Process 800 may include additional aspects, such as any single aspect or any combination of aspects described below and/or in connection with one or more other processes described elsewhere herein.

In a first aspect, the indication of the operating mode associated with the first candidate cell includes an indication of whether the first candidate cell is operating in one of a non-energy-saving mode or an energy-saving mode.

In a second aspect, alone or in combination with the first aspect, the indication of the operating mode associated with the first candidate cell includes an indication of a selection priority value associated with the first candidate cell.

In a third aspect, alone or in combination with one or more of the first and second aspects, the one or more conditional handover conditions are associated with the operating mode of the first candidate cell.

In a fourth aspect, alone or in combination with one or more of the first through third aspects, the one or more conditional handover conditions are specific to the first candidate cell.

In a fifth aspect, alone or in combination with one or more of the first through fourth aspects, the one or more conditional handover conditions apply to at least one of multiple candidate cells operating in a corresponding operating mode, or multiple candidate cells operating in a corresponding frequency range.

In a sixth aspect, alone or in combination with one or more of the first through fifth aspects, the configuration of the one or more conditional handover conditions associated with the first candidate cell includes a configuration of multiple handover condition thresholds associated with the first candidate cell, and a handover condition threshold, of the multiple handover condition thresholds, is selected based at least in part on availability of other candidate cells for the conditional handover procedure.

In a seventh aspect, alone or in combination with one or more of the first through sixth aspects, a first handover condition threshold is selected when at least one other candidate cell operating in a non-energy-saving mode is available for the conditional handover procedure, a second handover condition threshold is selected when no other candidate cells operating in a non-energy-saving mode are available for the conditional handover procedure, and the second handover condition threshold is less than the first handover condition threshold.

In an eighth aspect, alone or in combination with one or more of the first through seventh aspects, the configuration of the one or more conditional handover conditions associated with the first candidate cell includes a configuration of multiple handover condition thresholds, each associated with a corresponding operating mode associated with the first candidate cell, the operating mode associated with the first candidate cell is permitted to change dynamically, and the handover condition threshold is selected based at least in part on the indication of the operating mode associated with the first candidate cell.

In a ninth aspect, alone or in combination with one or more of the first through eighth aspects, the configuration of the one or more conditional handover conditions associated with the first candidate cell includes a configuration of at least one handover condition threshold associated with the first candidate cell, and the at least one handover condition threshold is associated with a measurement of a link between the UE and the first candidate cell.

In a tenth aspect, alone or in combination with one or more of the first through ninth aspects, the configuration of the one or more conditional handover conditions associated with the first candidate cell includes a configuration of at least one handover condition threshold associated with the first candidate cell, and the at least one handover condition threshold is associated with a time-to-trigger a conditional event associated with the first candidate cell.

In an eleventh aspect, alone or in combination with one or more of the first through tenth aspects, the configuration of the one or more conditional handover conditions associated with the first candidate cell is based at least in part on a frequency band associated with the first candidate cell.

In a twelfth aspect, alone or in combination with one or more of the first through eleventh aspects, the conditional handover procedure is associated with a conditional primary secondary cell group cell change.

In a thirteenth aspect, alone or in combination with one or more of the first through twelfth aspects, the configuration of the one or more conditional handover conditions associated with the first candidate cell is transmitted via an RRC message, an SIB message, or a MAC-CE message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
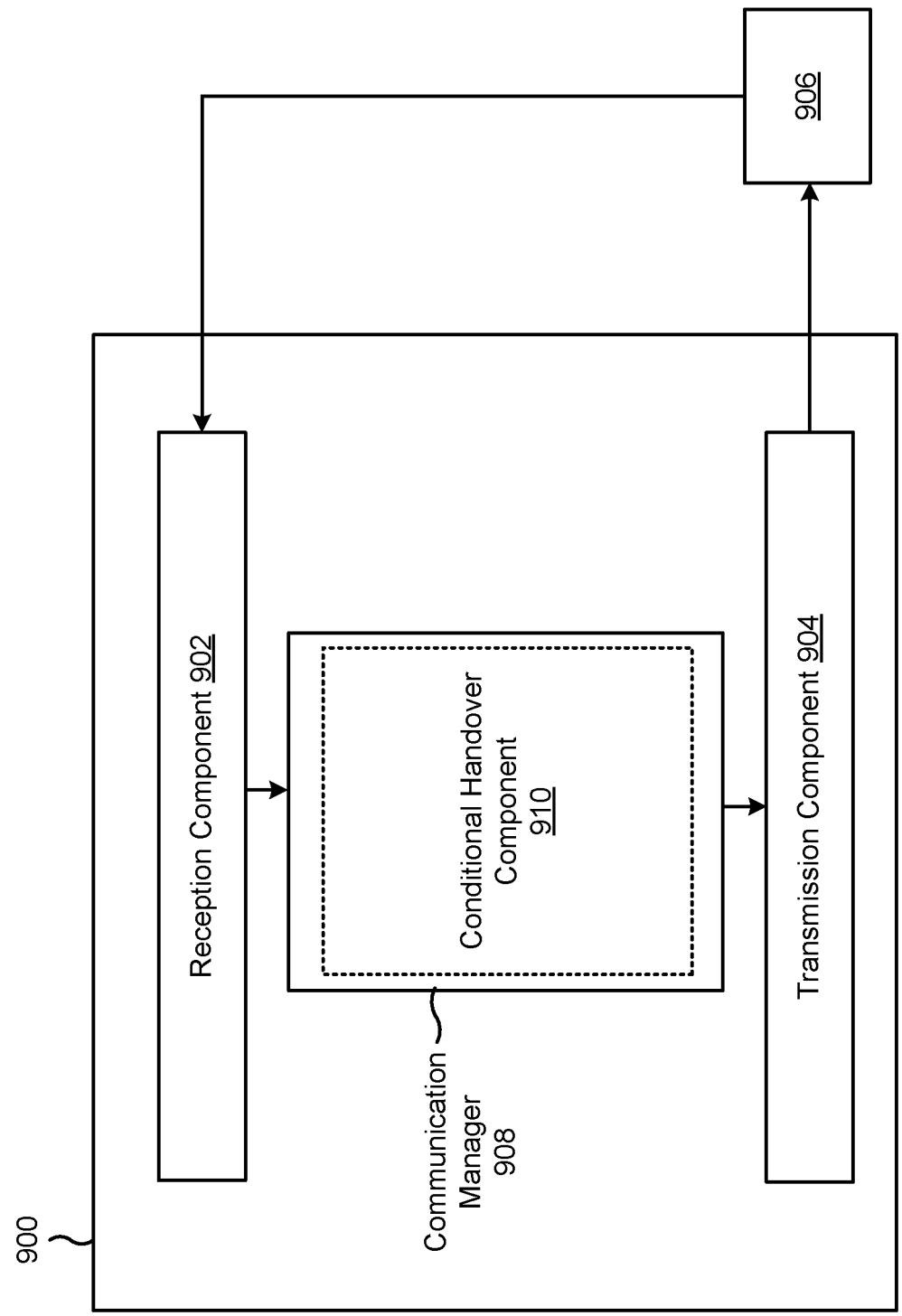
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE (e.g., UE 605), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908 (e.g., communication manager 140). The communication manager 908 may include a conditional handover component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE 120 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE 120 described in connection with FIG. 2. In some aspects, the transmission component 904 may be co-located with the reception component 902 in a transceiver.

The reception component 902 may receive, from a network entity, a configuration of one or more conditional handover conditions associated with a first candidate cell. The reception component 902 may receive an indication of an operating mode associated with the first candidate cell. The conditional handover component 910 may perform a conditional handover procedure based at least in part on the configuration of the one or more conditional handover conditions and the indication of the operating mode associated with the first candidate cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
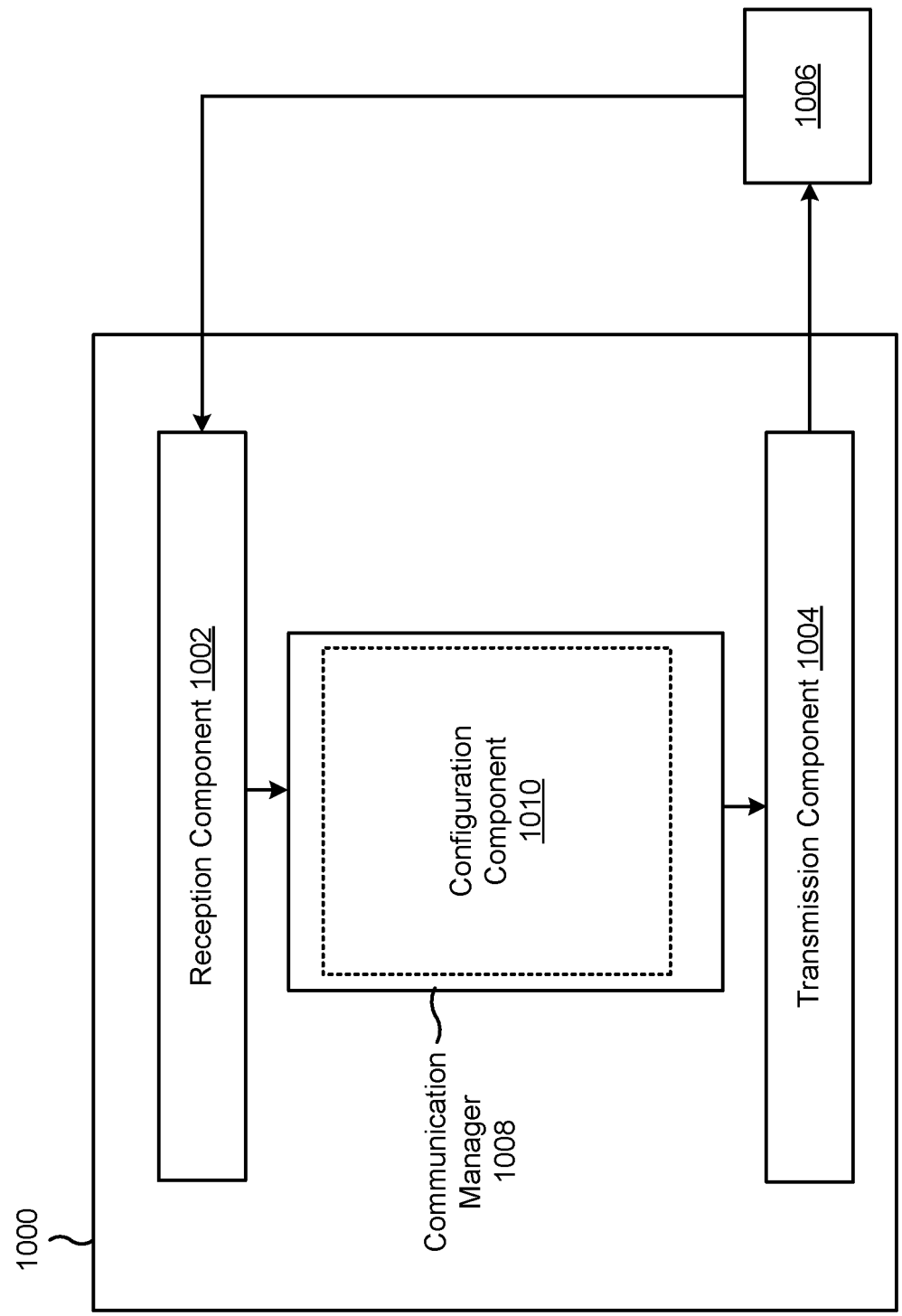
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network entity (e.g., source network entity 610), or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., communication manager 150). The communication manager 1008 may include a configuration component 1010, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station 110 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station 110 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station 110 described in connection with FIG. 2. In some aspects, the transmission component 1004 may be co-located with the reception component 1002 in a transceiver.

The transmission component 1004 and/or the configuration component 1010 may transmit, to a UE, a configuration of one or more conditional handover conditions associated with a first candidate cell of a conditional handover procedure, wherein the configuration of the one or more conditional handover conditions is based at least in part on an operating mode associated with the first candidate cell. The transmission component 1004 may transmit, to the UE, an indication of the operating mode associated with the first candidate cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving, from a network entity, a configuration of one or more conditional handover conditions associated with a first candidate cell; receiving an indication of an operating mode associated with the first candidate cell; and performing a conditional handover procedure based at least in part on the configuration of the one or more conditional handover conditions and the indication of the operating mode associated with the first candidate cell.

Aspect 2: The method of Aspect 1, wherein the indication of the operating mode associated with the first candidate cell includes an indication of whether the first candidate cell is operating in one of a non-energy-saving mode or an energy-saving mode.

Aspect 3: The method of any of Aspects 1-2, wherein the indication of the operating mode associated with the first candidate cell includes an indication of a selection priority value associated with the first candidate cell.

Aspect 4: The method of any of Aspects 1-3, wherein the one or more conditional handover conditions are associated with the operating mode of the first candidate cell.

Aspect 5: The method of Aspect 4, wherein of the one or more conditional handover conditions are specific to the first candidate cell.

Aspect 6: The method of Aspect 4, wherein the one or more conditional handover conditions apply to at least one of multiple candidate cells operating in a corresponding operating mode, or multiple candidate cells operating in a corresponding frequency range.

Aspect 7: The method of any of Aspects 1-6, wherein the configuration of the one or more conditional handover conditions associated with the first candidate cell includes a configuration of multiple handover condition thresholds associated with the first candidate cell, and wherein a handover condition threshold, of the multiple handover condition thresholds, is selected by the UE based at least in part on availability of other candidate cells for the conditional handover procedure.

Aspect 8: The method of Aspect 7, wherein a first handover condition threshold is selected when at least one other candidate cell operating in a non-energy-saving mode is available for the conditional handover procedure, wherein a second handover condition threshold is selected when no other candidate cells operating in a non-energy-saving mode are available for the conditional handover procedure, and wherein the second handover condition threshold is less than the first handover condition threshold.

Aspect 9: The method of any of Aspects 1-8, wherein the configuration of the one or more conditional handover conditions associated with the first candidate cell includes a configuration of multiple handover condition thresholds, each associated with a corresponding operating mode associated with the first candidate cell, wherein the operating mode associated with the first candidate cell is permitted to change dynamically, and wherein the handover condition threshold is selected based at least in part on receiving the indication of the operating mode associated with the first candidate cell.

Aspect 10: The method of any of Aspects 1-9, wherein performing the conditional handover procedure is based at least in part on a comparison of a measurement of a first link between the UE and the first candidate cell to a measurement of a second link between the UE and a second candidate cell.

Aspect 11: The method of any of Aspects 1-10, wherein the configuration of the one or more conditional handover conditions associated with the first candidate cell includes a configuration of at least one handover condition threshold associated with the first candidate cell, and wherein the at least one handover condition threshold is associated with a measurement of a link between the UE and the first candidate cell.

Aspect 12: The method of any of Aspects 1-11, wherein the configuration of the one or more conditional handover conditions associated with the first candidate cell includes a configuration of at least one handover condition threshold associated with the first candidate cell, and wherein the at least one handover condition threshold is associated with a time-to-trigger a conditional event associated with the first candidate cell.

Aspect 13: The method of any of Aspects 1-12, wherein the configuration of the one or more conditional handover conditions associated with the first candidate cell is based at least in part on a frequency band associated with the first candidate cell.

Aspect 14: The method of any of Aspects 1-13, wherein the conditional handover procedure is associated with a conditional primary secondary cell group cell change.

Aspect 15: The method of any of Aspects 1-14, wherein the configuration of the one or more conditional handover conditions associated with the first candidate cell is received via an RRC message, an SIB message, or a MAC-CE message.

Aspect 16: A method of wireless communication performed by a network entity, comprising: transmitting, to a UE, a configuration of one or more conditional handover conditions associated with a first candidate cell of a conditional handover procedure, wherein the configuration of the one or more conditional handover conditions is based at least in part on an operating mode associated with the first candidate cell; and transmitting, to the UE, an indication of the operating mode associated with the first candidate cell.

Aspect 17: The method of Aspect 16, wherein the indication of the operating mode associated with the first candidate cell includes an indication of whether the first candidate cell is operating in one of a non-energy-saving mode or an energy-saving mode.

Aspect 18: The method of any of Aspects 16-17, wherein the indication of the operating mode associated with the first candidate cell includes an indication of a selection priority value associated with the first candidate cell.

Aspect 19: The method of any of Aspects 16-18, wherein the one or more conditional handover conditions are associated with the operating mode of the first candidate cell.

Aspect 20: The method of Aspect 19, wherein of the one or more conditional handover conditions are specific to the first candidate cell.

Aspect 21: The method of Aspect 19, wherein the one or more conditional handover conditions apply to at least one of multiple candidate cells operating in a corresponding operating mode, or multiple candidate cells operating in a corresponding frequency range.

Aspect 22: The method of any of Aspects 16-21, wherein the configuration of the one or more conditional handover conditions associated with the first candidate cell includes a configuration of multiple handover condition thresholds associated with the first candidate cell, and wherein a handover condition threshold, of the multiple handover condition thresholds, is selected based at least in part on availability of other candidate cells for the conditional handover procedure.

Aspect 23: The method of Aspect 22, wherein a first handover condition threshold is selected when at least one other candidate cell operating in a non-energy-saving mode is available for the conditional handover procedure, wherein a second handover condition threshold is selected when no other candidate cells operating in a non-energy-saving mode are available for the conditional handover procedure, and wherein the second handover condition threshold is less than the first handover condition threshold.

Aspect 24: The method of any of Aspects 16-23, wherein the configuration of the one or more conditional handover conditions associated with the first candidate cell includes a configuration of multiple handover condition thresholds, each associated with a corresponding operating mode associated with the first candidate cell, wherein the operating mode associated with the first candidate cell is permitted to change dynamically, and wherein the handover condition threshold is selected based at least in part on the indication of the operating mode associated with the first candidate cell.

Aspect 25: The method of any of Aspects 16-24, wherein the configuration of the one or more conditional handover conditions associated with the first candidate cell includes a configuration of at least one handover condition threshold associated with the first candidate cell, and wherein the at least one handover condition threshold is associated with a measurement of a link between the UE and the first candidate cell.

Aspect 26: The method of any of Aspects 16-25, wherein the configuration of the one or more conditional handover conditions associated with the first candidate cell includes a configuration of at least one handover condition threshold associated with the first candidate cell, and wherein the at least one handover condition threshold is associated with a time-to-trigger a conditional event associated with the first candidate cell.

Aspect 27: The method of any of Aspects 16-26, wherein the configuration of the one or more conditional handover conditions associated with the first candidate cell is based at least in part on a frequency band associated with the first candidate cell.

Aspect 28: The method of any of Aspects 16-27, wherein the conditional handover procedure is associated with a conditional primary secondary cell group cell change.

Aspect 29: The method of any of Aspects 16-28, wherein the configuration of the one or more conditional handover conditions associated with the first candidate cell is transmitted via an RRC message, an SIB message, or a MAC-CE message.

Aspect 30: An apparatus for wireless communication at a device, comprising a processor; memory coupled with the processor; and instructions stored in the memory and executable by the processor to cause the apparatus to perform the method of one or more of Aspects 1-15.

Aspect 31: A device for wireless communication, comprising a memory and one or more processors coupled to the memory, the one or more processors configured to perform the method of one or more of Aspects 1-15.

Aspect 32: An apparatus for wireless communication, comprising at least one means for performing the method of one or more of Aspects 1-15.

Aspect 33: A non-transitory computer-readable medium storing code for wireless communication, the code comprising instructions executable by a processor to perform the method of one or more of Aspects 1-15.

Aspect 34: A non-transitory computer-readable medium storing a set of instructions for wireless communication, the set of instructions comprising one or more instructions that, when executed by one or more processors of a device, cause the device to perform the method of one or more of Aspects 1-15.

Aspect 35: An apparatus for wireless communication at a device, comprising a processor; memory coupled with the processor; and instructions stored in the memory and executable by the processor to cause the apparatus to perform the method of one or more of Aspects 16-29.

Aspect 36: A device for wireless communication, comprising a memory and one or more processors coupled to the memory, the one or more processors configured to perform the method of one or more of Aspects 16-29.

Aspect 37: An apparatus for wireless communication, comprising at least one means for performing the method of one or more of Aspects 16-29.

Aspect 38: A non-transitory computer-readable medium storing code for wireless communication, the code comprising instructions executable by a processor to perform the method of one or more of Aspects 16-29.

Aspect 39: A non-transitory computer-readable medium storing a set of instructions for wireless communication, the set of instructions comprising one or more instructions that, when executed by one or more processors of a device, cause the device to perform the method of one or more of Aspects 16-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a processor;
memory coupled to the processor; and
instructions stored in the memory and executable by the processor to cause the apparatus to:
receive, from a network entity, a configuration of one or more conditional handover conditions associated with a first candidate cell, wherein the configuration of the one or more conditional handover conditions comprises multiple handover condition thresholds associated with the first candidate cell, wherein each handover condition threshold is associated with a corresponding operating mode associated with the first candidate cell;
receive an indication of an operating mode associated with the first candidate cell; and
perform a conditional handover procedure based at least in part on the configuration of the one or more conditional handover conditions and the indication of the operating mode associated with the first candidate cell.

2. The apparatus of claim 1, wherein the indication of the operating mode associated with the first candidate cell includes an indication of whether the first candidate cell is operating in one of a non-energy-saving mode or an energy-saving mode.

3. The apparatus of claim 1, wherein the indication of the operating mode associated with the first candidate cell includes an indication of a selection priority value associated with the first candidate cell.

4. The apparatus of claim 1, wherein the one or more conditional handover conditions are associated with the operating mode of the first candidate cell.

5. The apparatus of claim 4, wherein the one or more conditional handover conditions are specific to the first candidate cell.

6. The apparatus of claim 4, wherein the one or more conditional handover conditions apply to at least one of multiple candidate cells operating in a corresponding operating mode, or multiple candidate cells operating in a corresponding frequency range.

7. The apparatus of claim 1, wherein a handover condition threshold, of the multiple handover condition thresholds, is selected by the UE based at least in part on availability of other candidate cells for the conditional handover procedure.

8. The apparatus of claim 7, wherein a first handover condition threshold is selected when at least one other candidate cell operating in a non-energy-saving mode is available for the conditional handover procedure, wherein a second handover condition threshold is selected when no other candidate cells operating in a non-energy-saving mode are available for the conditional handover procedure, and wherein the second handover condition threshold is less than the first handover condition threshold.

9. The apparatus of claim 1, wherein the configuration of the one or more conditional handover conditions associated with the first candidate cell includes a configuration of multiple handover condition thresholds, wherein the operating mode associated with the first candidate cell is permitted to change dynamically, and wherein the handover condition threshold is selected based at least in part on receiving the indication of the operating mode associated with the first candidate cell.

10. The apparatus of claim 1, wherein performing the conditional handover procedure is based at least in part on a comparison of a measurement of a first link between the UE and the first candidate cell to a measurement of a second link between the UE and a second candidate cell.

11. The apparatus of claim 1, wherein the configuration of the one or more conditional handover conditions associated with the first candidate cell includes a configuration of at least one handover condition threshold associated with the first candidate cell, and wherein the at least one handover condition threshold is associated with a measurement of a link between the UE and the first candidate cell.

12. The apparatus of claim 1, wherein the configuration of the one or more conditional handover conditions associated with the first candidate cell includes a configuration of at least one handover condition threshold associated with the first candidate cell, and wherein the at least one handover condition threshold is associated with a time-to-trigger a conditional event associated with the first candidate cell.

13. The apparatus of claim 1, wherein the configuration of the one or more conditional handover conditions associated with the first candidate cell is based at least in part on a frequency band associated with the first candidate cell.

14. The apparatus of claim 1, wherein the conditional handover procedure is associated with a conditional primary secondary cell group cell change.

15. The apparatus of claim 1, wherein the configuration of the one or more conditional handover conditions associated with the first candidate cell is received via a radio resource control (RRC) message, a system information block (SIB) message, or a medium access control (MAC) control element (MAC-CE) message.

16. An apparatus for wireless communication at a network entity, comprising:
a processor;
memory coupled to the processor; and
instructions stored in the memory and executable by the processor to cause the apparatus to:
transmit, to a user equipment (UE), a configuration of one or more conditional handover conditions associated with a first candidate cell of a conditional handover procedure, wherein the configuration of the one or more conditional handover conditions comprises multiple handover condition thresholds associated with the first candidate cell, and wherein the configuration of the one or more conditional handover conditions is based at least in part on an operating mode associated with the first candidate cell, wherein each handover condition threshold is associated with a corresponding operating mode associated with the first candidate cell; and transmit, to the UE, an indication of the operating mode associated with the first candidate cell.

17. The apparatus of claim 16, wherein the indication of the operating mode associated with the first candidate cell includes an indication of whether the first candidate cell is operating in one of a non-energy-saving mode or an energy-saving mode.

18. The apparatus of claim 16, wherein the indication of the operating mode associated with the first candidate cell includes an indication of a selection priority value associated with the first candidate cell.

19. The apparatus of claim 16, wherein the one or more conditional handover conditions are associated with the operating mode of the first candidate cell.

20. The apparatus of claim 19, wherein the one or more conditional handover conditions are specific to the first candidate cell.

21. The apparatus of claim 19, wherein the one or more conditional handover conditions apply to at least one of multiple candidate cells operating in a corresponding operating mode, or multiple candidate cells operating in a corresponding frequency range.

22. The apparatus of claim 16, and wherein a handover condition threshold, of the multiple handover condition thresholds, is selected based at least in part on availability of other candidate cells for the conditional handover procedure.

23. The apparatus of claim 22, wherein a first handover condition threshold is selected when at least one other candidate cell operating in a non-energy-saving mode is available for the conditional handover procedure, wherein a second handover condition threshold is selected when no other candidate cells operating in a non-energy-saving mode are available for the conditional handover procedure, and wherein the second handover condition threshold is less than the first handover condition threshold.

24. The apparatus of claim 16, wherein the operating mode associated with the first candidate cell is permitted to change dynamically, and wherein the handover condition threshold is selected based at least in part on the indication of the operating mode associated with the first candidate cell.

25. The apparatus of claim 16, wherein the configuration of the one or more conditional handover conditions associated with the first candidate cell includes a configuration of at least one handover condition threshold associated with the first candidate cell, and wherein the at least one handover condition threshold is associated with a measurement of a link between the UE and the first candidate cell.

26. The apparatus of claim 16, wherein the configuration of the one or more conditional handover conditions associated with the first candidate cell includes a configuration of at least one handover condition threshold associated with the first candidate cell, and wherein the at least one handover condition threshold is associated with a time-to-trigger a conditional event associated with the first candidate cell.

27. A method of wireless communication performed by a user equipment (UE), comprising:

receiving, from a network entity, a configuration of one or more conditional handover conditions associated with a first candidate cell, wherein the configuration of the one or more conditional handover conditions comprises multiple handover condition thresholds associated with the first candidate cell, wherein each handover condition threshold is associated with a corresponding operating mode associated with the first candidate cell;

receiving an indication of an operating mode associated with the first candidate cell; and performing a conditional handover procedure based at least in part on the configuration of the one or more conditional handover conditions and the indication of the operating mode associated with the first candidate cell.

28. The method of claim 27, wherein the indication of the operating mode associated with the first candidate cell includes an indication of whether the first candidate cell is operating in one of a non-energy-saving mode or an energy-saving mode.

29. A method of wireless communication performed by a network entity, comprising:

transmitting, to a user equipment (UE), a configuration of one or more conditional handover conditions associated with a first candidate cell of a conditional handover procedure, wherein the configuration of the one or more conditional handover conditions comprises multiple handover condition thresholds associated with the first candidate cell, and wherein the configuration of the one or more conditional handover conditions is based at least in part on an operating mode associated with the first candidate cell, wherein each handover condition threshold is associated with a corresponding operating mode associated with the first candidate cell; and transmitting, to the UE, an indication of the operating mode associated with the first candidate cell.

30. The method of claim 29, wherein the indication of the operating mode associated with the first candidate cell includes an indication of whether the first candidate cell is operating in one of a non-energy-saving mode or an energy-saving mode.

\* \* \* \* \*